United States Patent
Inoue et al.

(10) Patent No.: US 7,980,576 B2
(45) Date of Patent: Jul. 19, 2011

(54) VEHICULAR SUSPENSION ARM

(75) Inventors: Mitsuru Inoue, Tochigi (JP); Fumio Kikuchi, Tochigi (JP); Yutaka Hozumi, Saitama (JP); Jun Matsuike, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 322 days.

(21) Appl. No.: 12/063,601

(22) PCT Filed: Aug. 16, 2006

(86) PCT No.: PCT/JP2006/316095
§ 371 (c)(1),
(2), (4) Date: Feb. 11, 2009

(87) PCT Pub. No.: WO2007/020938
PCT Pub. Date: Feb. 22, 2007

(65) Prior Publication Data
US 2009/0295113 A1 Dec. 3, 2009

(30) Foreign Application Priority Data

Aug. 17, 2005 (JP) ................................. 2005-236770
Sep. 2, 2005 (JP) ................................. 2005-254488

(51) Int. Cl.
B60G 3/14 (2006.01)
(52) U.S. Cl. ... 280/124.121; 280/124.123; 280/124.145; 280/124.134
(58) Field of Classification Search ........... 280/124.133, 280/124.11, 124.145, 124.15
See application file for complete search history.

(56) References Cited

U.S. PATENT DOCUMENTS

| 4,377,298 | A | * | 3/1983 | Finn et al. .............. 280/124.142 |
| 4,509,774 | A | | 4/1985 | Booher |
| 4,986,566 | A | * | 1/1991 | Nishino et al. ......... 280/124.145 |
| 5,639,110 | A | * | 6/1997 | Pierce et al. ........... 280/124.116 |

(Continued)

FOREIGN PATENT DOCUMENTS

GB 2 205 074 A 11/1988
(Continued)

OTHER PUBLICATIONS

Inoue JP 2002 337525 Electronic English translation.*

Primary Examiner — Paul N Dickson
Assistant Examiner — Karen A Beck
(74) Attorney, Agent, or Firm — Arent Fox LLP

(57) ABSTRACT

A vehicular suspension arm is provided in which an arm main body (1) includes a main plate (2) press-formed as a main part of the arm main body and having a short cylindrical part (EB) provided integrally with one end by flanging, and a reinforcing plate (H) superimposed on one of upper and lower faces of the main plate (2) and reinforcing the main plate (2). The reinforcing plate (H) has an eye-shaped head part (Ha) formed in an annular shape and arranged coaxially with the short cylindrical part (EB), and a tail part (Hb) extending integrally from the eye-shaped head part (Ha) along the longitudinal direction of the main plate (2), is formed from a single plate material that is thicker than the main plate (2), and has at least the tail part (Hb) welded to the main plate (2). A bush press-fit portion (P1) is formed from an inner peripheral face of the eye-shaped head part (Ha) and an inner peripheral face of the short cylindrical part (EB). This ensures that the cross-sectional shape of a transition section from the bush press-fit portion to the plate-type arm main body is adequate, thus enabling the rigidity and strength required for the transition section to be easily guaranteed and, furthermore, it becomes possible to meet a requirement for increasing the strength of the arm without specially increasing the space around the outer periphery of the bush press-fit portion.

13 Claims, 20 Drawing Sheets

U.S. PATENT DOCUMENTS

| | | | |
|---|---|---|---|
| 5,992,867 A * | 11/1999 | Kato et al. | 280/124.134 |
| 6,913,273 B2 * | 7/2005 | Drabon et al. | 280/93.502 |
| 7,387,307 B2 * | 6/2008 | Tanaka et al. | 280/124.135 |
| 7,597,335 B2 | 10/2009 | Nachbar | |
| 2004/0080132 A1 * | 4/2004 | Chan et al. | 280/124.11 |
| 2009/0102153 A1 * | 4/2009 | Jung | 280/124.15 |

FOREIGN PATENT DOCUMENTS

| | | |
|---|---|---|
| JP | 53-148423 A | 12/1978 |
| JP | 61-91408 | 6/1986 |
| JP | 5-112111 | 5/1993 |
| JP | 08-099511 A | 4/1996 |
| JP | 11-20435 | 1/1999 |
| JP | 2002-337524 | 11/2002 |
| JP | 2002-337525 | 11/2002 |
| JP | 2004-301228 A | 10/2004 |
| JP | 2004-533952 | 11/2004 |
| JP | 2005-008123 A | 1/2005 |
| JP | 2005-59046 A | 3/2005 |
| JP | 2007-527816 A | 10/2007 |

* cited by examiner (a)

(b)

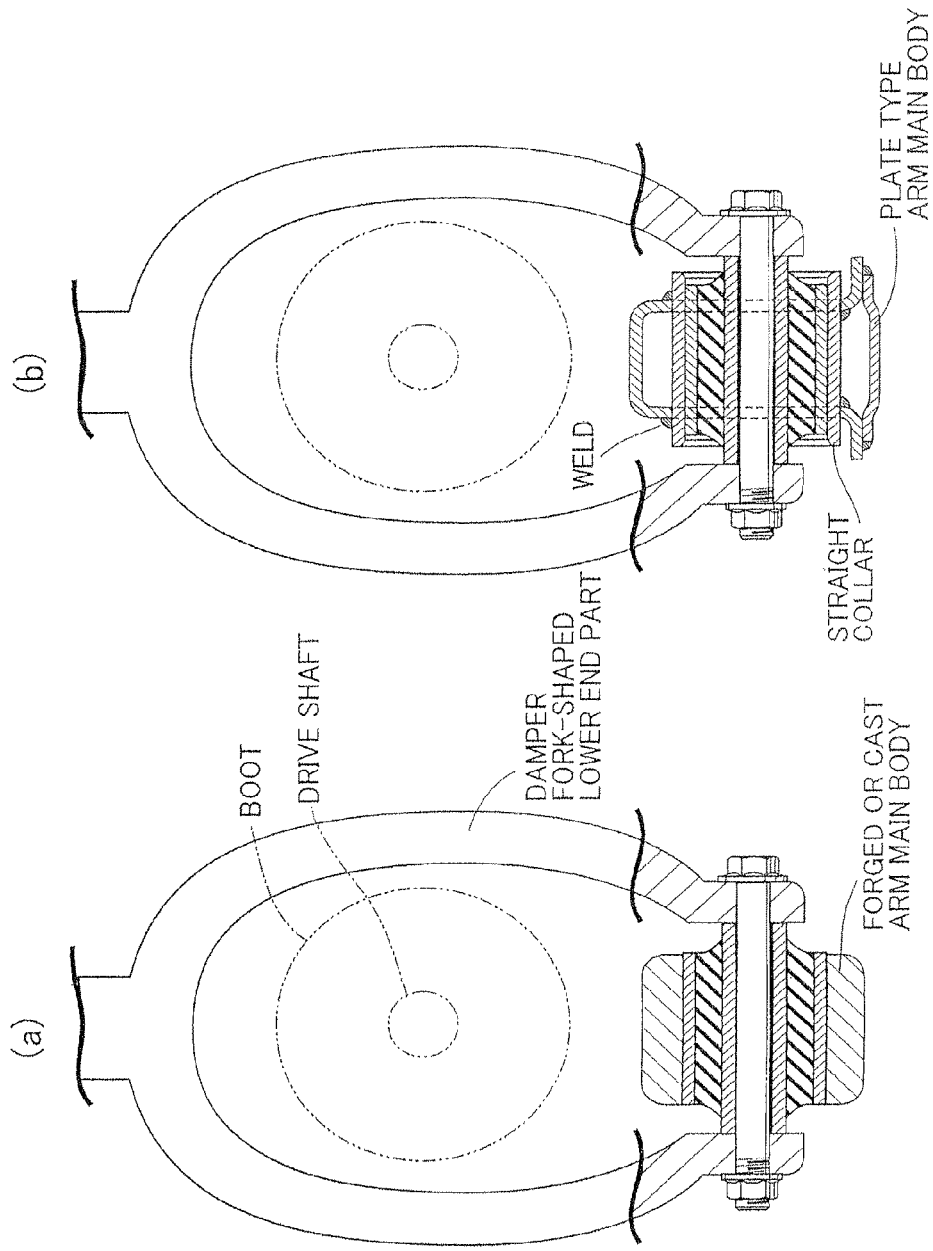

VEHICULAR SUSPENSION ARM

CROSS-REFERENCE TO RELATED APPLICATION

This application is a National Stage entry of International Application No. PCT/JP2006/316095, filed Aug. 16, 2006, the entire specification claims and drawings of which are incorporated herewith by reference.

TECHNICAL FIELD

The present invention relates to a vehicular suspension arm having an arm main body formed from a metal plate.

BACKGROUND ART

With regard to a vehicular suspension arm that includes an arm main body made of a metal plate and a bush press-fit portion, provided at one end of the arm main body, into which a bush can be press-fitted, there has already been proposed, for example, an arrangement in which a pair of upper and lower inner peripheral flanges are formed by flanging inner peripheral parts of ring plate-shaped upper and lower end plates integrally connected respectively to one end of an upper plate and one end of a lower plate forming the arm main body so as to face each other inwardly, and inner peripheral faces of these inner peripheral flanges serve as bush press-fitting faces (ref. e.g. FIG. 4 of Patent Publication 1 below).

In this proposed arrangement, forward end faces of the pair of upper and lower inner peripheral flanges are made to abut against each other, and outer peripheral parts of the upper end plate and the lower end plate are bent inwardly so as to substantially conform to the inner peripheral flanges on the inside thereof, thus forming a pair of upper and lower outer peripheral flanges having forward end faces facing each other across a gap. It is therefore possible to impart to the bush press-fit portion the same level of rigidity and strength as that of a collar and, moreover, since there is no welded portion between the upper and lower end plates, it is unnecessary to employ a lap margin for welding, and there is the advantage that the arm end part shape can be made as small as possible.

A vehicular suspension arm, and in particular a suspension arm having a structure that includes an arm main body having one end connected to a vehicle body side and the other end connected to a wheel side, and a bush support member for press-fitting and supporting a bush connected via a connecting pin to a fork-shaped lower end part of a damper straddling a middle part of the arm main body with a gap, a drive shaft running through the gap, is conventionally known, but in a suspension arm having this structure, since it is necessary to ensure that there is a space on the upper side of the middle part of the arm main body, which serves as a damper support part, in order to avoid interfering with the drive shaft and a protective boot surrounding a joint thereof, and a space on the lower side thereof in order to avoid interfering with a wheel in a fully turned or full bump state, the space for installing the arm main body middle part is quite limited and, moreover, since a large damper support load acts on the arm main body middle part, it is necessary for it to be formed with high strength and high rigidity.

However, when a suspension arm is produced by forging or casting as shown in, for example, FIG. 28(a) in order to meet all these requirements, there are problems such as heavy weight and high cost. In order to solve these problems, an attempt has already been made to make a suspension arm by press-forming a metal plate, but such a suspension arm tends to have a large cross-sectional shape for an arm main body middle part, which serves as a damper support part, it becomes difficult to meet the recent demand for diversification in vehicle needs (for example, an increase in wheel diameter, an increase in engine output, an increase in the size of the drive shaft, etc.), and there are inconveniences such as the types of vehicle to which it is applied being greatly restricted.

Furthermore, as an improvement of the structure of the plate suspension arm, a structure has been proposed in which, as shown in for example, FIG. 28(b), a cylindrical straight sleeve is used as a bush support member for supporting a damper lower end part support bush on an arm main body middle part, and this sleeve is welded to opposite side walls of the arm main body middle part, but in this proposed structure, since it is necessary to ensure that there is a welding margin by making a collar end part protrude outward from the side wall of the arm main body middle part to a considerable extent (e.g. 7 mm), it is difficult to design the arm main body itself so as to have a sufficient cross-sectional width in the confined space around the arm main body middle part, and there is the problem that sufficient arm strength cannot be guaranteed, etc.

In order to solve this problem, for example, as shown in FIG. 8 of Patent Publication 2 below, an improved technique has been proposed in which a pair of left and right flange-equipped brackets (sleeve halves) are inserted from opposite sides of an arm main body, and the flanges are superimposed on and welded to the arm main body so as to give a sufficient cross-sectional width to the arm main body itself in a confined space around the arm main body middle part, thus satisfying the desired strength conditions.

Patent Publication 1: Japanese Patent Application Laid-open No. 2002-337525
Patent Publication 2: Japanese Patent Application Laid-open No. 2002-337524

DISCLOSURE OF INVENTION

Problems to be Solved by the Invention

However, in the suspension arm structure of Patent Publication 1 above, it is necessary to subject each of the upper end plate and the lower end plate, which are connected to one end of the individually press-formed upper plate and lower plate respectively, to flanging, and there are the problems that the total number of machining steps is large, the machining steps are complicated, the productivity is poor, and the machining costs increase.

Furthermore, accompanying a demand for higher strength for the suspension arm and an increasingly restricted space around the arm due to an increase in vehicle horsepower, an improvement in tire profile, etc., when a further increase in the retaining strength around the bush is required, it is necessary to increase the thickness of the upper plate and the lower plate, and the increase in plate thickness results in increases in the weight and the cost as well as an increase in the space occupied, and there is thus a possibility of greatly restricting the degree of freedom in layout.

Moreover, although the strength requirements for the suspension arm generally vary among vehicle types (normal vehicle, luxury vehicle, sports vehicle), since a common mold is usually used for molding an upper plate and a lower plate, it is difficult to meet the strength requirements by setting the plate thickness accordingly, and a normal vehicle will suffer from an increase in weight and an increase in cost.

The present invention has been proposed in the light of the above-mentioned circumstances, and it is a first object thereof to provide a vehicular suspension arm that can solve the above-mentioned conventional problems by means of a simple structure even if part of a bush press-fit portion and an arm main body are integrated, or even if flanging of an arm main body in order to form a bush press-fit portion is omitted.

On the other hand, in the suspension arm of Patent Publication 2 above, there are cases in which, with regard to a type of vehicle for which there is a particularly large fore-and-aft input load from the tire due to a further increase in the wheel diameter, a higher output of the engine, etc., strength-related problems might be difficult to deal with.

The present invention has been proposed in the light of the above-mentioned circumstances, and it is a second object thereof to provide a vehicular suspension arm that can solve the above-mentioned conventional problems of a plate type arm by means of a simple structure even if the arm main body is made from a press-formed metal plate.

Means for Solving the Problems

In order to attain the above first object, according to a first aspect of the present invention, there is provided a vehicular suspension arm comprising an arm main body and a bush press-fit portion that is provided at one end of the arm main body and into which a bush can be press-fitted, characterized in that the arm main body comprises at least a main plate press-formed as a main part of the arm main body and having a short cylindrical part provided integrally with one end by flanging, and a reinforcing plate superimposed on one of upper and lower faces of the main plate and reinforcing the main plate, the reinforcing plate has an eye-shaped head part formed in an annular shape and arranged coaxially with the short cylindrical part, and a tail part extending integrally from the eye-shaped head part along the longitudinal direction of the main plate, is formed from a plate material that is thicker than the main plate, and has at least the tail part welded to the main plate, and the bush press-fit portion is formed from an inner peripheral face of the eye-shaped head part and an inner peripheral face of the short cylindrical part.

According to a second aspect of the present invention, there is provided a vehicular suspension arm comprising an arm main body and a bush press-fit portion that is provided at one end of the arm main body and into which a bush can be press-fitted, characterized in that the arm main body comprises at least a main plate press-formed as a main part of the arm main body and having an annular eye-shaped end part provided integrally with one end, and a reinforcing plate superimposed on one of upper and lower faces of the main plate and reinforcing the main plate, the reinforcing plate has an eye-shaped head part formed in an annular shape and arranged coaxially with the eye-shaped end part, and a tail part extending integrally from the eye-shaped head part along the longitudinal direction of the main plate, is formed from a plate material that is thicker than the main plate, and has at least the tail part welded to the main plate, and the bush press-fit portion is formed from an inner peripheral face of the eye-shaped head part or an inner peripheral face of the eye-shaped head part and an inner peripheral face of the eye-shaped end part.

According to a third aspect of the present invention, there is provided a vehicular suspension arm comprising an arm main body and a bush press-fit portion that is provided at one end of the arm main body and into which a bush can be press-fitted, characterized in that the arm main body comprises at least a hollow frame and a reinforcing plate, the hollow frame being formed from a body formed by joining upper and lower plates, each of which is press-formed, in order to form a main part of the arm main body, the reinforcing plate having an annular eye-shaped head part and a tail part extending integrally from the eye-shaped head part, and the tail part being inserted into and welded to a hollow part in one end part of the hollow frame, and the reinforcing plate is formed from a plate material that is thicker than the upper and lower plates, and the bush press-fit portion is formed from an inner peripheral face of the eye-shaped head part.

In order to attain the above first object likewise, according to a fourth aspect of the present invention, in addition to the third aspect, the arm main body further comprises a second reinforcing plate having an annular eye-shaped head part and a tail part extending integrally from the eye-shaped head part, the tail part being welded to one of upper and lower faces of one end part of the hollow frame, the second reinforcing plate being formed from a plate material that is thicker than the upper and lower plates, and the bush press-fit portion being also formed from an inner peripheral face of the eye-shaped head part of the second reinforcing plate (H').

According to a fifth aspect of the present invention, in addition to the fourth aspect, the tail part of one of the reinforcing plates is formed so as to be longer than the tail part of the other reinforcing plate and extends along the longitudinal direction of the hollow frame.

According to a sixth aspect of the present invention, in addition to any one of the first to fifth aspects, the reinforcing plate is formed by punching out a single plate material using a press.

According to a seventh aspect of the present invention, in addition to the first or second aspect, the reinforcing plate has formed thereon a positioning projection or hole, the positioning projection or hole carrying out positioning of the reinforcing plate relative to the main plate in cooperation with a positioning hole provided in the main plate.

According to an eighth aspect of the present invention, in addition to any one of the third, fourth and fifth aspects, the reinforcing plate has formed thereon a positioning projection or hole, the positioning projection or hole carrying out positioning of the reinforcing plate relative to the hollow frame in cooperation with a positioning hole provided in the upper or lower plate.

According to a ninth aspect of the present invention, in addition to any one of the first, second and third aspects, joined to the reinforcing plate in a layered state is a local strengthening plate formed from a plate material integrally having a ring part superimposed on the eye-shaped head part and a tongue piece superimposed only on part of a base side of the tail part, the bush press-fit portion being also formed from an inner peripheral face of the ring part.

According to a tenth aspect of the present invention, in addition to the fourth aspect, joined to the second reinforcing plate in a layered state is a local strengthening plate formed from a plate material integrally having a ring part superimposed on the eye-shaped head part and a tongue piece superimposed only on part of a base side of the tail part, the bush press-fit portion being also formed from an inner peripheral face of the ring part.

According to an eleventh aspect of the present invention, in addition to the ninth or tenth aspect, an inner face of a through hole formed in the tongue piece and the tail part on which the tongue piece is superimposed are welded, the weld allowing the local reinforcing plate and the reinforcing plate to be joined.

In order to the above second object, according to a twelfth aspect of the present invention, there is provided a vehicular suspension arm comprising an arm main body formed as a hollow body from a press-formed metal plate and having one end connected to a vehicle body side and the other end connected to a wheel side, and a bush support sleeve for fitting and supporting a connecting bush for a fork-shaped lower end part of a damper straddling with a gap a middle part of the arm main body extending in substantially the width direction of the arm main body, a drive shaft running through the gap, the arm main body having a pair of front and rear sleeve holes formed in a front side wall and a rear side wall respectively of the middle part, the bush support sleeve having opposite ends fitted into the front and rear sleeve holes, and the bush support sleeve having welding margin parts for welding the sleeve and the arm main body provided on the opposite end parts so as to protrude outward from the arm main body, wherein the middle part of the arm main body is formed so as to have a substantially trapezoidal cross-section in which a lower wall is longer than an upper wall and a front side wall and a rear side wall widen in going downward, the bush support sleeve is formed in a substantially trapezoidal shape, corresponding to the cross-sectional shape of the arm main body, when viewed from the side so that the welding margin parts can be guaranteed, and the bush support sleeve further has a clearance formed on each of front and rear end faces in order to ensure that there is a clearance between the fork-shaped lower end part of the damper and the sleeve when there is relative displacement between the fork-shaped lower end part and the arm main body.

In order to attain the above second object likewise, according to a thirteenth aspect of the present invention, in addition to the twelfth aspect, the bush support sleeve is formed in a tubular shape by wrap-forming a press-formed plate type sleeve material so that one edge part and the other edge thereof are connected to each other, and the one edge part and the other edge part are welded to each other.

According to a fourteenth aspect of the present invention, in addition to the twelfth or thirteenth aspect, the bush support sleeve has a simple cylindrical inner sleeve fitted into and fixed to an inner peripheral face, the inner sleeve being shorter than the sleeve, and the bush is fitted into and supported by the bush support sleeve via the inner sleeve.

According to a fifteenth aspect of the present invention, in addition to any one of the twelfth to fourteenth aspects, the pair of sleeve holes are formed as a cutout opening upward, and communicate with each other via an opening provided in the arm main body so as to transect the upper wall.

According to a sixteenth aspect of the present invention, in addition to the fifteenth aspect, the opening has opposing inside faces substantially perpendicular to an outer face of the arm main body, the bush support sleeve has a pair of rib parts on a peripheral wall so as to correspond to each of the two inside faces of the opening, the rib parts protruding outward in the radial direction of the sleeve and being formed along generatrixes of the sleeve and spaced from each other in the peripheral direction, and each of the rib parts and the inside face of the opening are welded.

According to a seventeenth aspect of the present invention, in addition to the sixteenth aspect, the arm main body has a support bracket joined to the other end part along the longitudinal direction of the other end part, the support bracket being capable of retaining a wheel-supporting ball joint on an outer end part, and the support bracket has an inner end part thereof engaged with and welded to an engagement depression formed in one of the rib parts.

EFFECTS OF THE INVENTION

In accordance with the first aspect of the present invention, the arm main body includes at least the main plate and the reinforcing plate, the main plate being press-formed, forming the main part of the arm main body, and having the short cylindrical part integrally provided at one end by flanging, and the reinforcing plate being superimposed on one of upper and lower faces of the main plate and reinforcing the main plate. The reinforcing plate has the eye-shaped head part and the tail part, the eye-shaped head part being formed in an annular shape and arranged coaxially with the short cylindrical part, and the tail part extending integrally from the eye-shaped head part along the longitudinal direction of the main plate; the reinforcing plate is formed from a plate material that is thicker than the main plate, at least the tail part is welded to the main plate, and the inner peripheral face of the eye-shaped head part and the inner peripheral face of the short cylindrical part form the bush press-fit portion. Part of the bush press-fit portion and the arm main body can therefore be integrally joined without a seam and this is advantageous for increasing the strength. Moreover, the above reinforcing plate ensures that the cross-sectional shape of the transition section from the bush press-fit portion to the plate-like arm main body is adequate, thus enabling the rigidity and strength required for the transition section to be guaranteed and, furthermore, since flanging for forming the bush press-fit portion only needs to be carried out for one end part of the main plate, the machining step can be simplified accordingly, thus contributing to an improvement in productivity and a saving in the cost of machining. Moreover, when a further improvement in the strength of the suspension arm is desired due to an increase in vehicle horsepower, etc., it can be satisfied simply by increasing the thickness of the reinforcing plate without specially increasing the space around the outer periphery of the bush press-fit portion and, furthermore, when strength requirements for the suspension arm are different for variations between vehicle models, they can be satisfied by a change in the thickness of the reinforcing plate simply and at low cost. Moreover, since the bush press-fit portion is formed from the inner peripheral face of the eye-shaped head part of the reinforcing plate and the inner peripheral face of the flanged short cylindrical part of the arm main body, a sufficient retaining load for the bush can be guaranteed, and it becomes possible to omit or reduce the positions at which the arm main body is welded to the reinforcing plate around the press-fit portion.

Furthermore, in accordance with the second aspect of the present invention, the arm main body includes at least the main plate and the reinforcing plate, the main plate being press-formed, forming the main part of the arm main body, and being provided integrally with the annular eye-shaped end part, and the reinforcing plate being superimposed on one of upper and lower faces of the main plate and reinforcing the main plate. The reinforcing plate has the eye-shaped head part and the tail part, the eye-shaped head part being formed in an annular shape and arranged coaxially with the eye-shaped end part, and the tail part extending integrally from the eye-shaped head part along the longitudinal direction of the main plate; the reinforcing plate is formed from a plate material that is thicker than the main plate, and at least the tail part is welded to the main plate. Since the bush press-fit portion is formed from the inner peripheral face of the eye-shaped head part, or the inner peripheral face of the eye-shaped head part and the inner peripheral face of the eye-shaped end part, it is possible to ensure by means of the reinforcing plate that the cross-sectional shape of the transition section from the bush press-fit portion to the plate-like arm main body is adequate, it becomes possible to easily guarantee the rigidity and strength necessary for the transition section and, furthermore, flanging for forming the bush press-fit portion can be omitted while retaining the integral structural portion between the arm main body and the bush press-fit portion, thus contributing to an improvement in productivity and a saving in the cost of machining. Moreover, when a further improvement in the strength of the suspension arm is desired due to an increase in vehicle horsepower, etc., it can be satisfied simply by increasing the thickness of the reinforcing plate without specially increasing the space around the outer periphery of the bush press-fit portion and, furthermore, when strength requirements for the suspension arm are different for variations between vehicle types, they can be satisfied by a change in the thickness of the reinforcing plate simply and at low cost. Moreover, particularly when the bush press-fit portion is formed from the inner peripheral face of the eye-shaped head part of the reinforcing plate and the inner peripheral face of the eye-shaped end part, a sufficient retaining load for the bush can be guaranteed, and it becomes possible to omit or reduce the positions at which the arm main body is welded to the reinforcing plate around the press-fit portion.

Furthermore, in accordance with the third aspect of the present invention, the arm main body includes at least the hollow frame and the reinforcing plate, the hollow frame being formed from the joining of the upper and lower plates, which are each press-formed so as to form the main part of the arm main body, and the reinforcing plate having the annular eye-shaped head part and the tail part extending integrally from the eye-shaped head part, with the tail part being inserted into and welded to the hollow part at one end of the hollow frame. Since the reinforcing plate is formed from a plate material that is thicker than the upper and lower plates, and the bush press-fit portion is formed from the inner peripheral face of the eye-shaped head part, it is possible to ensure by means of the reinforcing plate that the cross-sectional shape of the transition section from the bush press-fit portion to the plate-like arm main body is adequate, it becomes possible to easily guarantee the rigidity and strength necessary for the transition section and, furthermore, flanging for forming the bush press-fit portion can be omitted, thus contributing to an improvement in productivity and a saving in the cost of machining. Moreover, when a further improvement in the strength of the suspension arm is desired due to an increase in vehicle horsepower, etc., it can be satisfied simply by increasing the thickness of the reinforcing plate without specially increasing the space around the outer periphery of the bush press-fit portion and, furthermore, when strength requirements for the suspension arm are different for variations between vehicle types, they can be satisfied by a change in the thickness of the reinforcing plate simply and at low cost.

Moreover, in accordance with the fourth aspect in particular, in addition to the third aspect, since the arm main body further includes the second reinforcing plate, which has the annular eye-shaped head part and the tail part extending integrally from the eye-shaped head part, the tail part being welded to one of upper and lower faces of one end of the hollow frame, the second reinforcing plate is formed from a plate material that is thicker than the upper and lower plates, and the bush press-fit portion is also formed from the inner peripheral face of the eye-shaped head part of the second reinforcing plate, it is possible to guarantee a sufficient retaining load for the bush.

Moreover, in accordance with the fifth aspect in particular, in addition to the fourth aspect, the tail part of one of the reinforcing plates is formed so as to be longer than the tail part of the other reinforcing plate and extends along the longitudinal direction of the upper and lower plates, and the long tail part can enhance the bond strength between said one reinforcing plate and the hollow frame.

Furthermore, in accordance with the sixth aspect in particular, in addition to the first to fifth aspects, since the reinforcing plate is formed by punching out a single plate material using a press, not only is the productivity of the reinforcing plate, which is a separate structure from the arm main body, outstandingly high, but it is also possible to easily form the inner peripheral face of the eye-shaped head part, which becomes a bush press-fit portion of the reinforcing plate, by utilizing the cut face from the press punching, thereby enabling the high inner diameter precision necessary for the bush press-fitting to be easily achieved at low cost.

Moreover, in accordance with the seventh or eighth aspect in particular, since the positioning projection or hole, which carries out positioning of the reinforcing plate relative to the main plate or the hollow plate in cooperation with the positioning hole provided in the main plate or the upper or lower plate, is formed in the reinforcing plate, even if the reinforcing plate is a separate structure from the arm main body, positioning of the reinforcing plate can reliably and easily be carried out with high precision by a simple positioning structure.

Furthermore, in accordance with the ninth or tenth aspect in particular, since the local strengthening plate is bonded in a layered state to the reinforcing plate or the second reinforcing plate, the local strengthening plate being formed from a plate material integrally having the ring part superimposed on the eye-shaped head part and the tongue piece superimposed only on part of the base side of the tail part, and the bush press-fit portion is also formed from the inner peripheral face of the ring part, the bush retaining strength can be enhanced by increasing effectively the axial width of the bush press-fit portion due to the layering effect of the local strengthening plate, while minimizing the increase in thickness of the tail part of the reinforcing plate (that is, while reducing the weight of the reinforcing plate) and, moreover, the overall cross-section of the reinforcing plate and the local strengthening plate thins in sequence from the bush press-fit portion to the arm main body side so as to make a smooth transition to the cross-section of the arm main body.

Moreover, in accordance with the eleventh aspect in particular, since the local reinforcing plate and the reinforcing plate are welded between the inner face of the through hole formed in the tongue piece and the tail part on which the tongue piece is superimposed, it is possible to reduce the weight of the local strengthening plate while guaranteeing a necessary welding strength.

Furthermore, in accordance with the twelfth aspect of the present invention, since the middle part of the arm main body is formed in a substantially trapezoidal cross-section so that the lower wall is longer than the upper wall and the front side wall and the rear side wall widen in going downward, and when viewed from the side the bush support sleeve is formed in a substantially trapezoidal shape, corresponding to the cross-sectional shape of the arm main body, so that the welding margin part between the sleeve and the arm main body can be guaranteed, a design is possible in which a sufficient cross-sectional width, with respect to a large vertical input load acting on the arm main body from the fork-shaped lower end part of the damper via the sleeve and the bush and a large fore-and-aft input load (brake reaction) from a tire, can be efficiently imparted to the arm middle part itself in a confined space, thus guaranteeing sufficient strength even for an arm main body having a plate structure. Moreover, since a clearance is formed at the front and rear end faces of the bush support sleeve in order to ensure that there is a clearance between the fork-shaped lower end part of the damper and the sleeve for relative displacement between the arm main body and the fork-shaped lower end part, even if the side face shape of the sleeve is a trapezoidal shape corresponding to the cross-sectional shape of the arm main body middle part, there is no possibility of the front and rear end faces of the sleeve, which widen in going downward, interfering with the fork-shaped lower end part of the damper.

Moreover, in accordance with the thirteenth aspect in particular, since the bush support sleeve is formed in a tubular shape by wrap-forming a press-formed plate type sleeve material so as to connect together one edge part and the other edge part and welding said one edge part and other edge part to each other, even when the front and rear end faces of the bush support sleeve widen downward when viewed from the side as described above and have a complicated line shape due to the presence of the clearances, the complicated line shape can be formed with good precision by simple press-forming of the plate type sleeve material, thus contributing to an improvement in the precision of the machining step and an increase in efficiency.

Furthermore, in accordance with the fourteenth aspect in particular, since the simple cylindrical inner sleeve that is shorter than the bush support sleeve is fitted into and fixed to the inner peripheral face of the bush support sleeve, and the bush is fitted into and supported by the bush support sleeve via the inner sleeve, even when the side face shape of the sleeve is a trapezoidal shape as described above, a double sleeve structure in which the inner sleeve is provided only for a section necessary for retaining the bush (that is, omitting surplus material as much as possible) can be obtained, thus enabling the rigidity and strength of the sleeve to be increased sufficiently while reducing the weight thereof. Moreover, since the machining precision for the outer sleeve can be relatively low compared with the inner sleeve, which directly retains the bush, the corresponding machining cost can be saved.

Moreover, in accordance with the fifteenth aspect in particular, since the pair of sleeve holes formed in the front and rear side walls respectively of the arm main body are each formed as a cutout hole opening upward, and communicate with each other via an opening provided in the arm main body so as to transect the upper wall thereof, machining of the sleeve hole becomes relatively easy, the cost can be reduced, and it becomes possible to use a relatively large diameter bush support sleeve, part of which juts out from the sleeve hole.

Furthermore, in accordance with the sixteenth aspect in particular, even when the inner side face of the opening of the arm main body upper wall is substantially perpendicular to the outer face of the arm main body for convenience when machining, since the pair of rib parts protruding radially outward of the sleeve are formed on the peripheral wall of the bush support sleeve so as to correspond to the two inner side faces of the opening along the generatrix of the sleeve and spaced from each other in the peripheral direction, and the rib parts and the inner side face of the opening are welded together, the gap between the inner side face of the opening and the bush support sleeve (the above rib parts) can be filled as much as possible, thus enhancing effectively the strength of the welded part in the gap.

Moreover, in accordance with the seventeenth aspect in particular, since the support bracket, which can retain the wheel-supporting ball joint via the outer end part, is joined to said other end part of the arm main body along the longitudinal direction of said other end part, and the inner end part of the support bracket is engaged with and welded to the engagement recess formed in the rib part, the region in which the support bracket is welded onto the arm main body is extended by using the rib part of the bush support sleeve, thus enhancing the strength with which the support bracket is bonded to the arm main body.

BRIEF DESCRIPTION OF DRAWINGS

FIG. 28 are sectional views of an essential part showing a part in which a conventional suspension arm and a damper are joined.

EXPLANATION OF REFERENCE NUMERALS AND SYMBOLS

Figure 1:
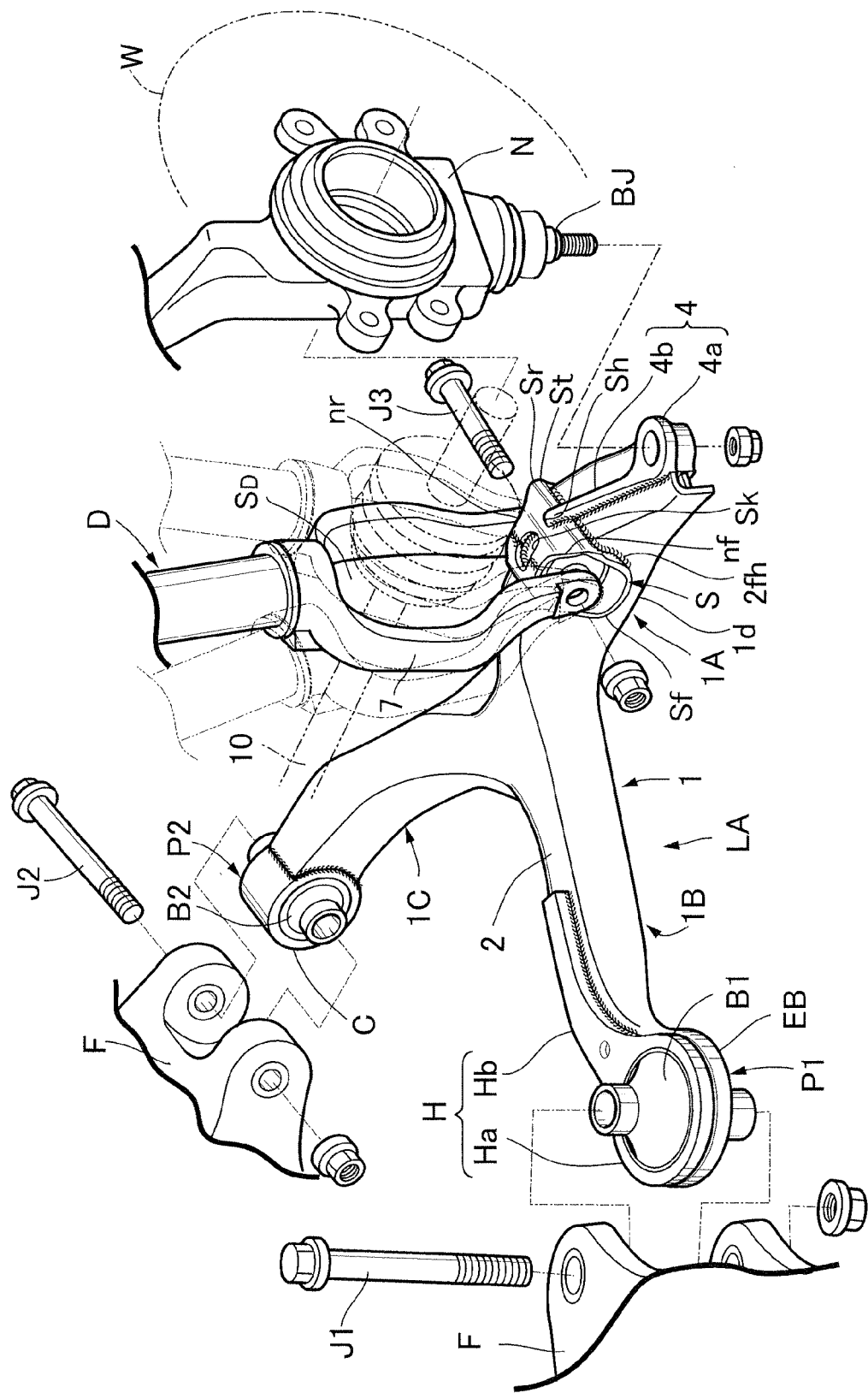
FIG. 1 is a perspective view schematically showing a state in which a vehicular suspension arm related to one embodiment of the present invention is mounted on a vehicle.
Figure 2:
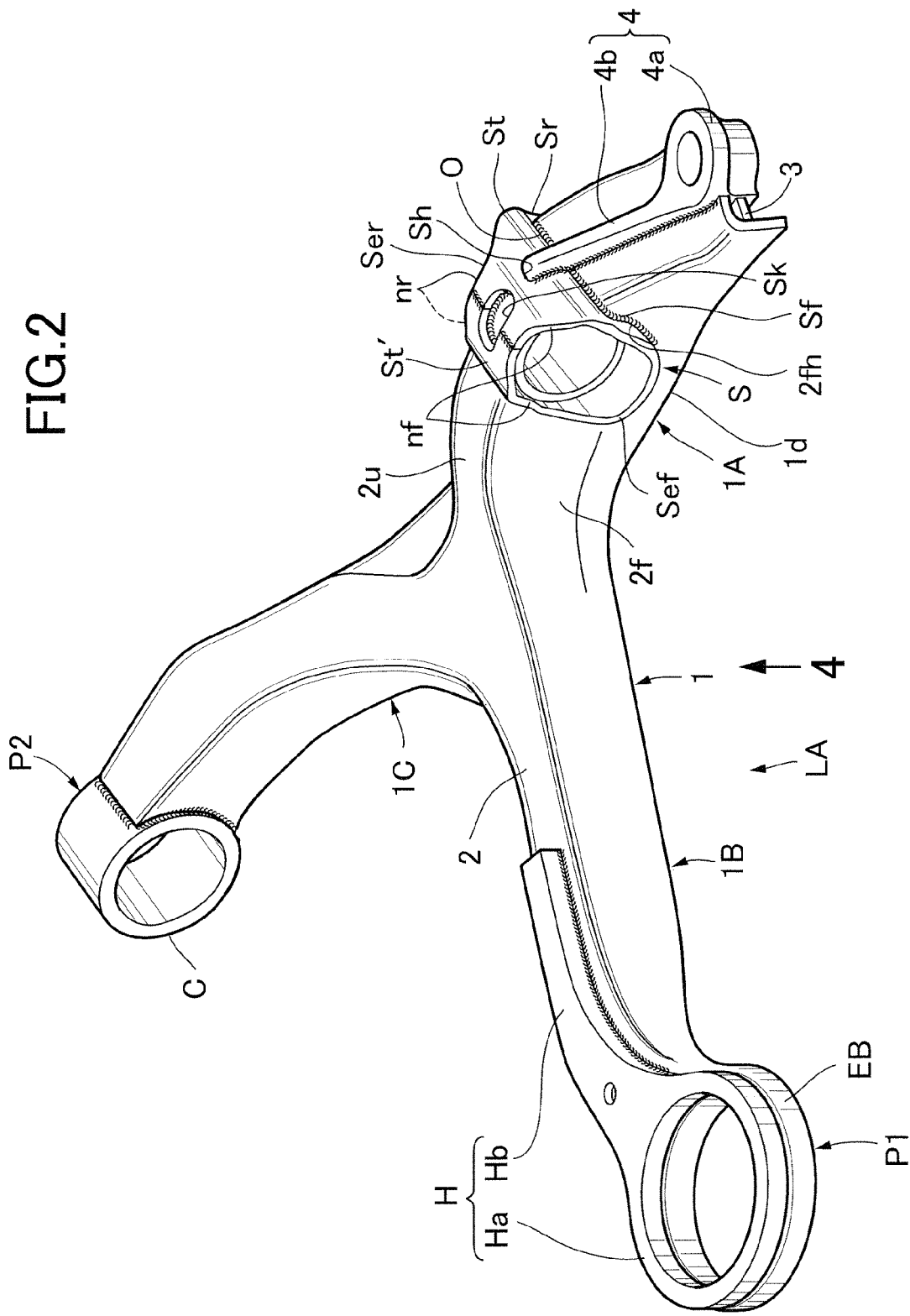
FIG. 2 is a perspective view of the suspension arm on its own.
Figure 3:
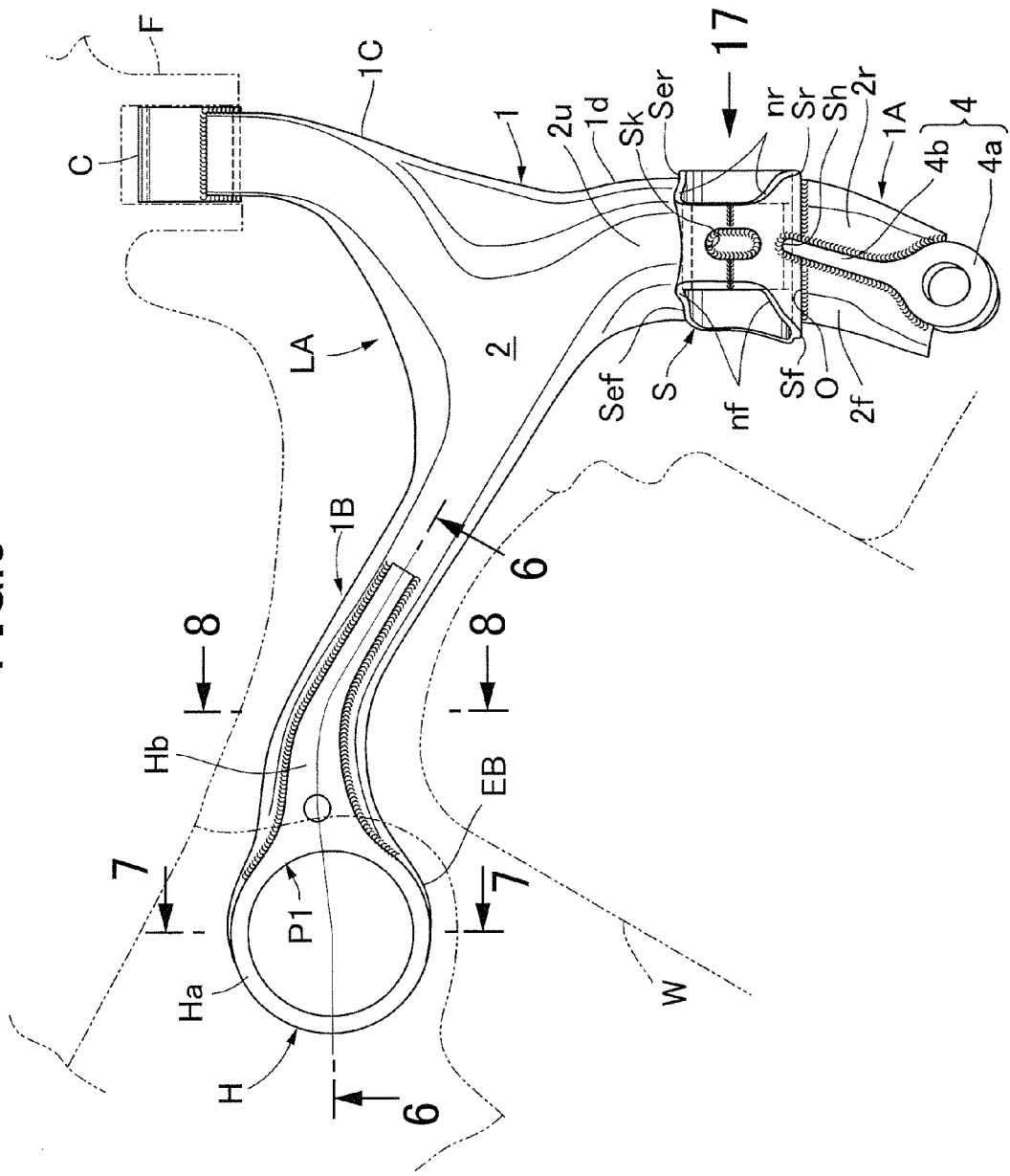
FIG. 3 is a plan view of the suspension arm on its own.
Figure 4:
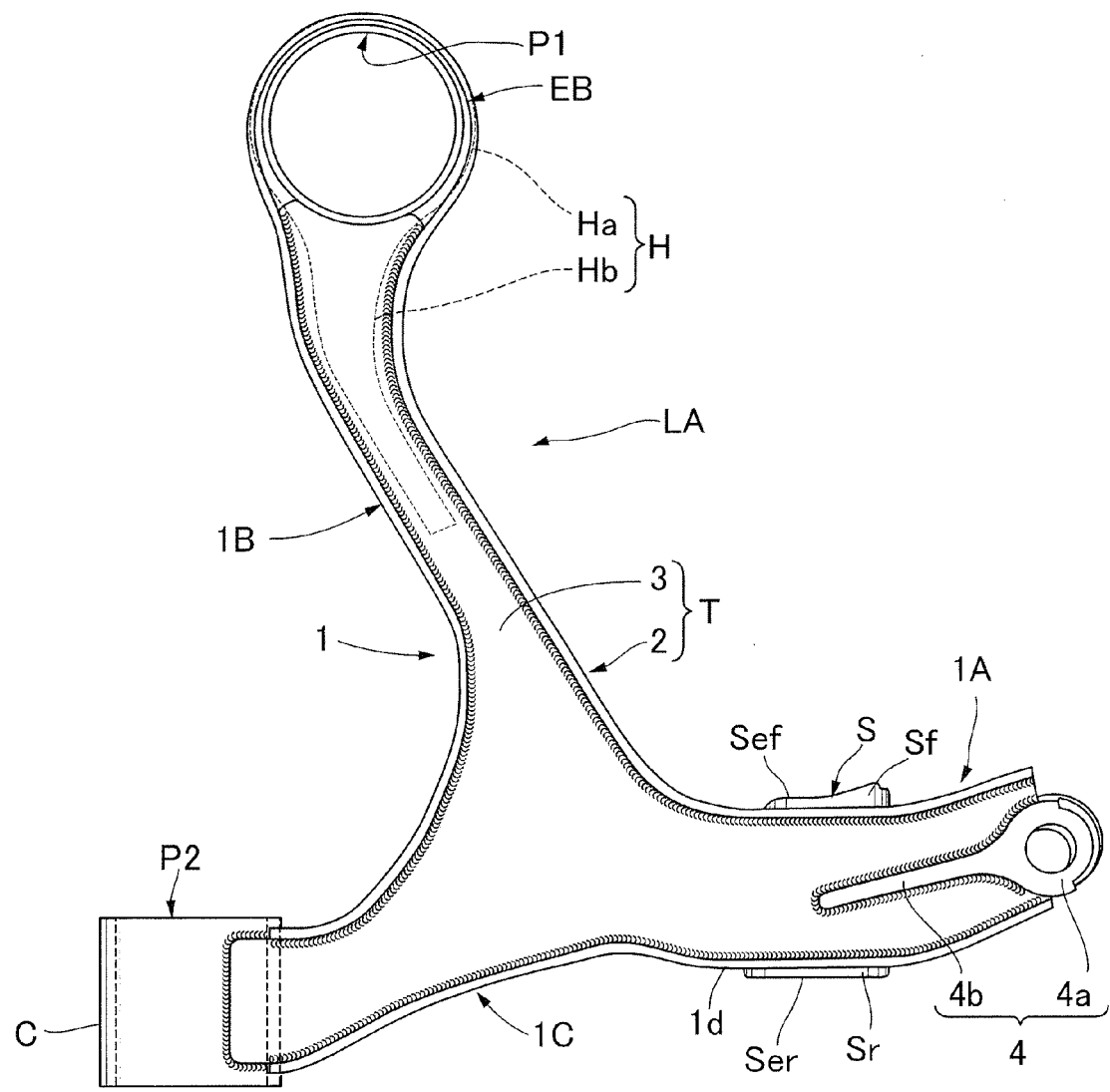
FIG. 4 is a bottom view of the suspension arm on its own (view from arrow 4 in FIG. 2).
Figure 5:
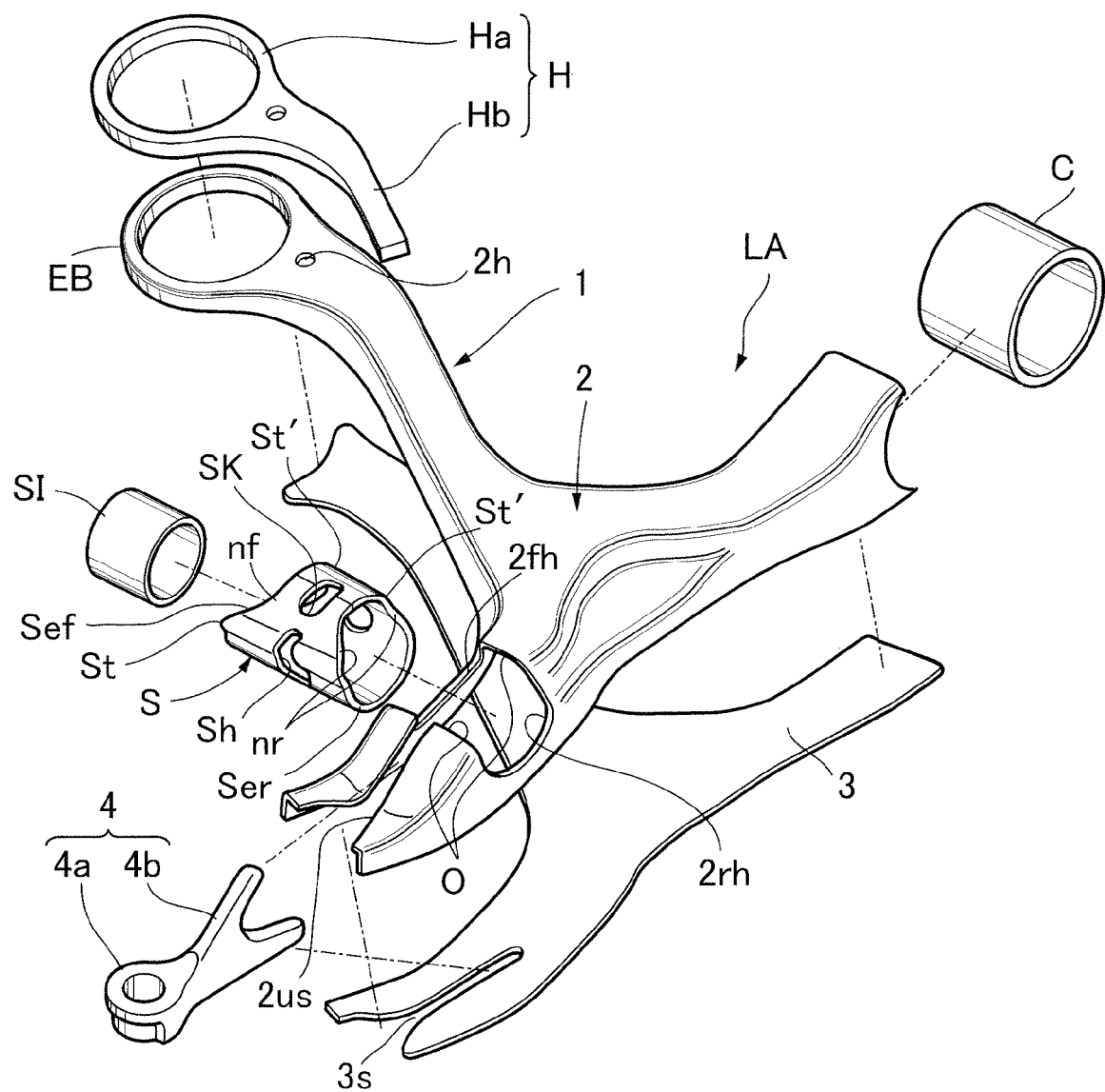
FIG. 5 is an exploded perspective view of the suspension.

B1 First rubber bush (bush)
EB Short cylindrical part
EP Eye-shaped end part
H, H' Reinforcing plate Ha, Ha' Eye-shaped head part
Hb, Hb' Tail part
H" Local strengthening plate
Ha" Ring part
Hb" Tongue piece
LA Lower arm (suspension arm)
P1 First bush press-fit portion (bush press-fit portion)
T Hollow frame
1 Arm main body
2 Upper plate (main plate)
3 Lower plate
100 Through hole
BJ Wheel-supporting ball joint
B3 Third rubber bush (bush)
D Damper
F Vehicle body or subframe
J3 Connecting pin
nf, nr Clearance
LA Lower arm (suspension arm)
O Opening
P3 Third bush press-fit portion (bush press-fit portion)
S Bush support sleeve
Sa One edge part
Sb Other edge part
Sef Front end face
Ser Rear end face
Sf, Sr Welding margin part
Sh Engagement hole (engagement recess)
St, St' Rib part
SI Inner sleeve
$S_D$ Gap
W Wheel
1 Arm main body
$1d$ Middle part
2 Upper plate (metal plate)
3 Lower plate (metal plate, lower wall)
7 Fork-shaped lower end part
10 Drive shaft
$2f$ Upper plate front side wall part (front side wall)
$2r$ Upper plate rear side wall part (rear side wall)
$2u$ Upper plate upper wall part (upper wall)
$2fh$, $2rh$ Sleeve hole
4 Support bracket

BEST MODE FOR CARRYING OUT THE INVENTION

A mode for carrying out the present invention is specifically explained below by reference to embodiments of the present invention shown in the attached drawings.

EMBODIMENT 1

As shown in FIG. 1, a knuckle N rotatably supporting a wheel W has its lower part and its upper part vertically movably supported, on a vehicle body or a subframe connected thereto (hereinafter, simply called a vehicle body F), by a lower arm A and an upper arm (not illustrated) respectively. Furthermore, a damper D equipped with a coil spring is disposed between the vehicle body F and a middle part of the lower arm A in order to support the weight of the vehicle body and cushion vertical movement of the knuckle N.

The lower arm A is a so-called A type arm and forms a suspension arm of the present invention. This lower arm LA has its outer end part swivelably joined to the knuckle N via a ball joint BJ and has bifurcated first and second inner end parts joined to the vehicle body F via a pair of front and rear rubber bushes B1 and B2 and connecting pins J1 and J2 running therethrough.

Referring to FIG. 2 to FIG. 5 together, an arm main body 1 of the lower arm LA is formed as a main part from a hollow frame T formed by integrally joining an upper plate 2 and a lower plate 3 to each other, the plates each being formed by press-forming a steel plate, and includes an outer arm portion 1A, a first inner arm portion 1B, and a second inner arm portion 1C, the outer arm portion 1A extending from an arm middle part toward an outer end part in substantially the direction of the vehicle width (that is, substantially the lateral direction of the vehicle body), the first inner arm portion 1B extending obliquely forwardly and inwardly from the middle part toward a first inner end part, and the second inner arm portion 1C extending obliquely rearwardly and inwardly from the middle part toward a second inner end part. A first bush press-fit portion P1 is provided so as to be connected to the first inner end part on the front side of the arm main body 1, the first bush press-fit portion P1 press-fit supporting the first rubber bush B1 via the inner periphery, a second bush press-fit portion P2 is provided so as to be connected to the second inner end part on the rear side, the second bush press-fit portion P2 press-fit supporting the second rubber bush B2 via the inner periphery, and a support bracket 4 having a mounting hole for supporting the ball joint BJ is welded to the outer end part of the arm main body 1.

The axis of the first bush press-fit portion P1 is set in a substantially vertical direction and the second bush press-fit portion P2 is set along substantially the longitudinal direction of the vehicle body. The second bush press-fit portion P2 is formed from a cylindrical metal collar C in the illustrated example, and an outer peripheral part of the collar C is welded to the second inner end part on the rear side of the upper plate 2 and the lower plate 3.

Each portion (that is, the outer arm portion 1A, and the first and second inner arm portions 1B and 1C) from the middle of the arm main body 1 is formed in a substantially trapezoidal cross-section in the illustrated example in which the lower wall is longer than the upper wall and the front side wall and the rear side wall widen in going downward. That is, the upper plate 2 is formed, so as to have a substantially U-shaped cross section, from a substantially flat upper wall part and a front side wall part and a rear side wall part that hang down while widening in going downward from the front and rear ends of the upper wall part, and the lower plate 3 is formed in a flat plate shape so as to block the lower end opening of the upper plate 2, and is abutted against and welded between inner faces of lower end parts of the front and rear side wall parts of the upper plate 2.

Figure 6:
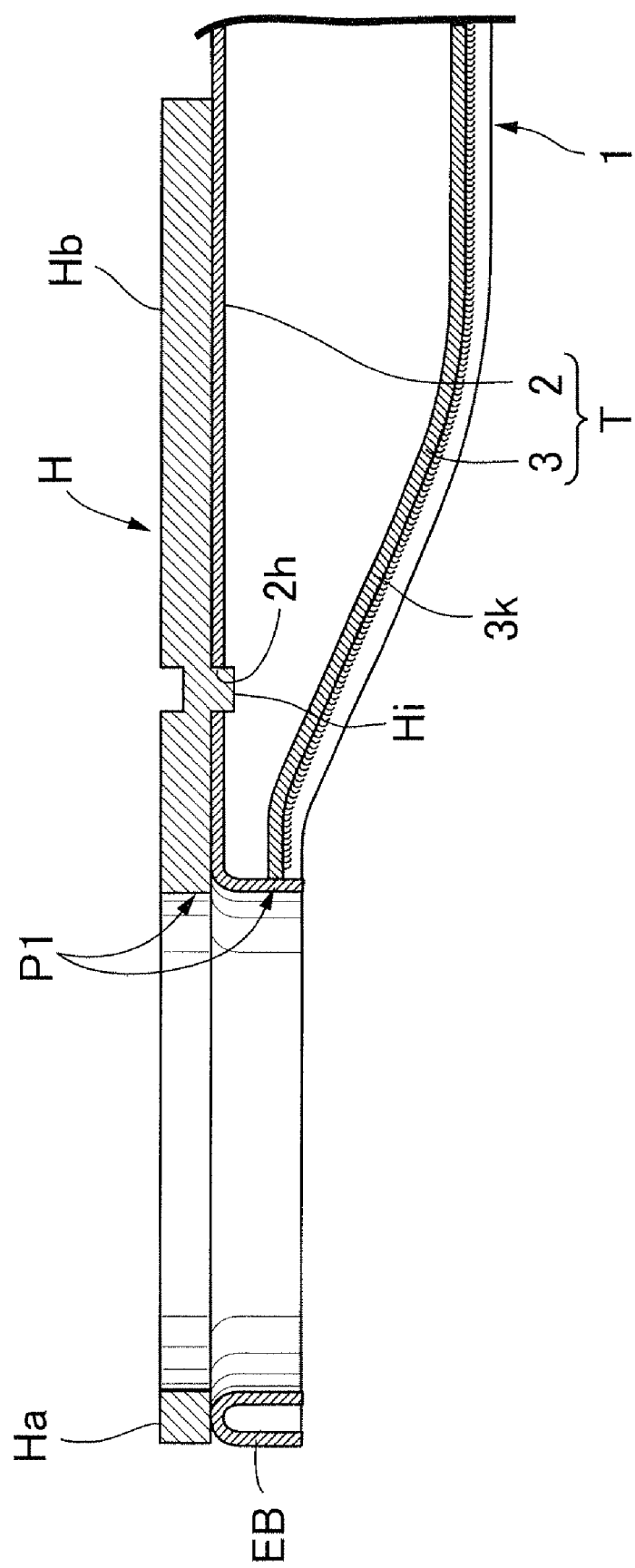
FIG. 6 is an enlarged sectional view along line 6-6 in FIG. 3.
Figure 7:
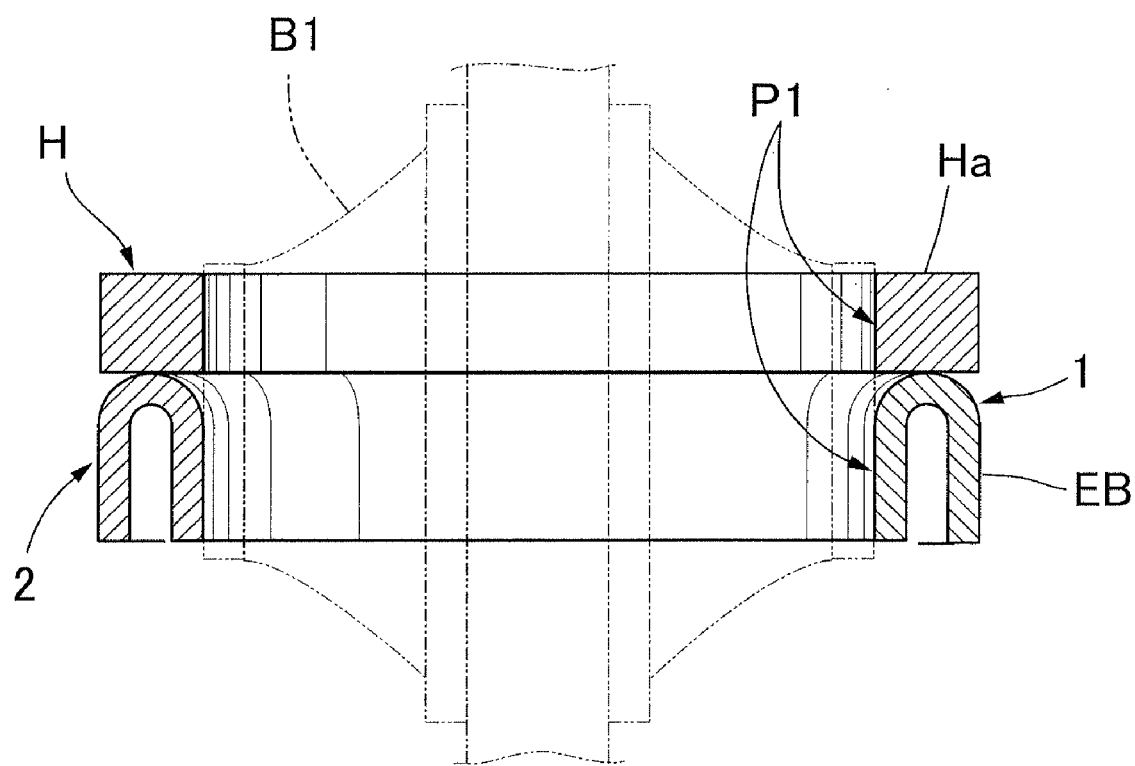
FIG. 7 is an enlarged sectional view along line 7-7 in FIG. 3.
Figure 8:
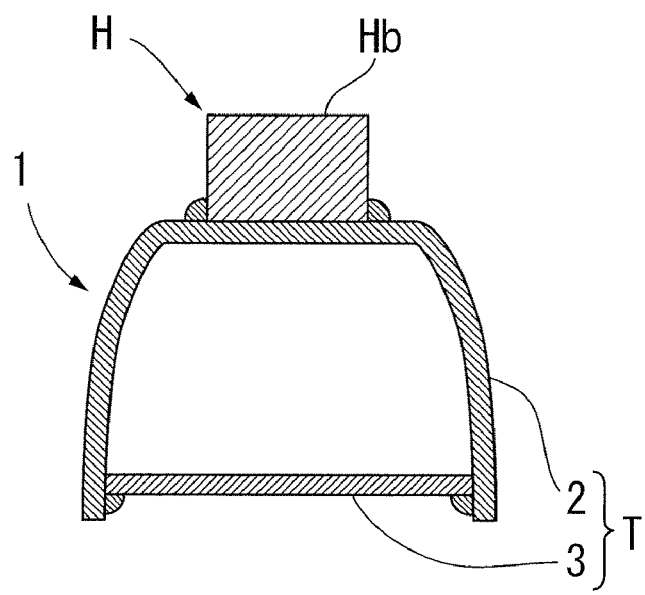
FIG. 8 is an enlarged sectional view along line 8-8 in FIG. 3.

The structure of the first bush press-fit portion P1 of the lower arm LA is now explained by reference to FIG. 6 to FIG. 8.

The first inner arm portion 1B of the arm main body 1 includes the upper plate 2 as a main plate forming a main part of the inner arm portion 1B and having a short cylindrical part EB provided integrally with one end by flanging, the lower plate 3 welded to the upper plate 2 so as to block the open lower face thereof, and a reinforcing plate H formed from a single plate material superimposed on and welded to an upper face of the upper plate 2 and reinforcing the upper plate 2.

This reinforcing plate H has an eye-shaped head part Ha formed in an annular shape and arranged coaxially with the short cylindrical part EB, and a tail part Hb extending integrally from the eye-shaped head part Ha along the longitudinal direction of the upper plate 2, and is formed by punching out a steel plate that is thicker than the upper and lower plates 2 and 3 using a press. Of the reinforcing plate H, at least the tail part Hb is welded to the upper plate 2 along substantially the whole length. The eye-shaped head part Ha of the reinforcing plate H and the short cylindrical part EB of the upper plate 2 are not welded in the illustrated example, but may be welded as necessary.

The first bush press-fit portion P1 is thus formed from the inner peripheral face of the press-formed eye-shaped head part Ha and the inner peripheral face of the flanged short cylindrical part EB. An outer peripheral collar B1c of the first rubber bush B1 is fitted into and retained by these inner peripheral faces by sequentially press-fitting from one side in the axial direction (the upper side in the illustrated example).

In accordance with the above-mentioned structure of the first bush press-fit portion P1, since part of the press-fit portion P1 and the arm main body 1 are integrally joined without a seam, this is advantageous in terms of increasing the strength, and it becomes possible to easily guarantee the rigidity and strength necessary for a transition section from the bush press-fit portion P1 to the plate type arm main body 1 by maintaining a sufficient cross-sectional shape for the transition section by specially providing the reinforcing plate H with the long tail part Hb along the longitudinal direction of the arm main body 1. Moreover, since flanging for forming the bush press-fit portion P1 only needs to be carried out for one end part of the main plate (upper plate 2), the machining step can be simplified accordingly, thus improving the productivity and reducing the machining cost.

Furthermore, when a further improvement in the strength of the lower arm LA is desired due to an increase in vehicle horsepower, etc., the demand can be met easily by increasing the thickness of the reinforcing plate H without specially increasing the space around the outer periphery of the bush press-fit portion P1 and, moreover, when strength requirements for the lower arm LA are different for variations between vehicle types, they can be satisfied by a change in the thickness of the reinforcing plate H simply and at low cost. Furthermore, since the first bush press-fit portion P1 is formed from the inner peripheral face of the eye-shaped head part Ha of the reinforcing plate H and the inner peripheral face of the flanged short cylindrical part EP of the arm main body 1, a sufficient retaining load for the first rubber bush B1 can be guaranteed, and it becomes possible to omit or reduce the positions at which the arm main body 1 is welded to the reinforcing plate H around the press-fit portion P1. Moreover, since the reinforcing plate H is formed by punching out a single plate material using a press, not only is the productivity of the reinforcing plate H, which is a separate structure from the arm main body 1, outstandingly high, but it is also possible to easily form the inner peripheral face of the eye-shaped head part Ha, which becomes the bush press-fit portion P1 of the reinforcing plate H, by utilizing the cut face from the press punching, thereby enabling the high inner diameter precision necessary for the bush press-fit to be easily achieved at low cost.

Figure 9:
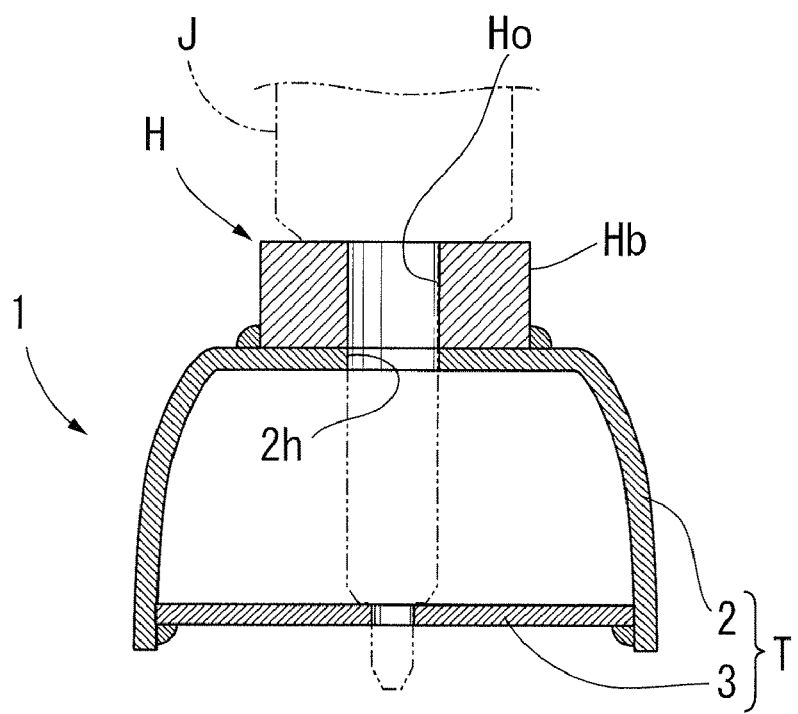
FIG. 9 is a view, corresponding to FIG. 8, showing a modified example of a structure for positioning a reinforcing plate relative to an arm main body.

Furthermore, a positioning projection Hi is formed in a portion, close to the eye-shaped head part Ha, of the tail part Hb of the reinforcing plate H, the positioning projection Hi carrying out positioning of the reinforcing plate H relative to the upper plate 2 in cooperation with a positioning hole 2h provided in the upper plate 2. Therefore, even if the reinforcing plate H is a separate structure from the arm main body 1, positioning of the reinforcing plate H can reliably and easily be carried out with high precision by a simple positioning structure. In addition, instead of such a positioning projection Hi, as shown in FIG. 9 a positioning hole Ho may be provided in the reinforcing plate H, and positioning is carried out by utilizing a jig J that fits into the hole Ho and the positioning hole 2h of the upper plate 2.

Figure 10:
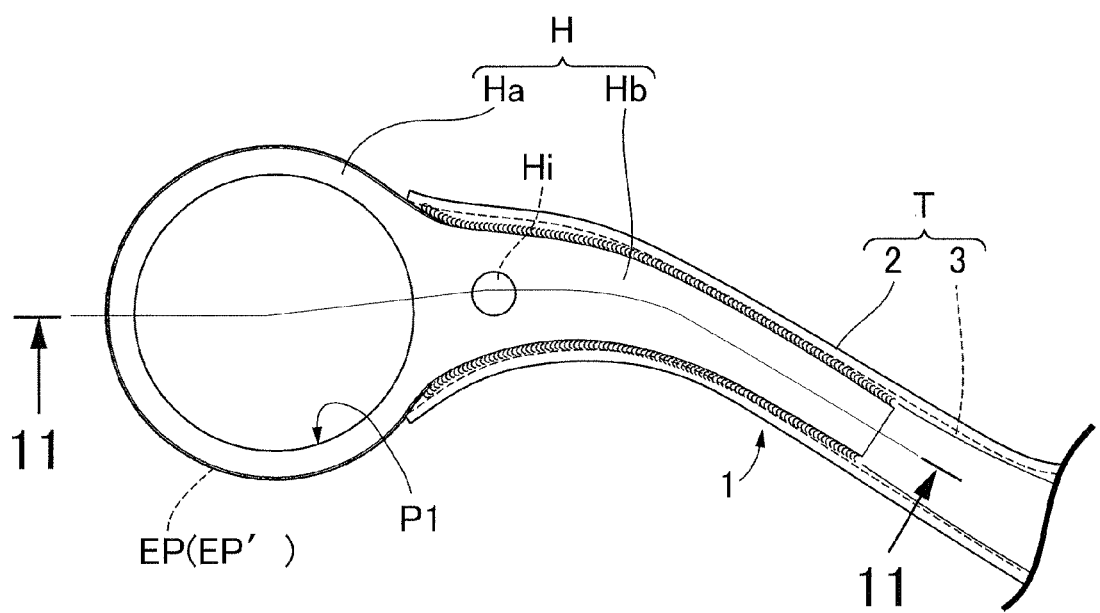
FIG. 10 is a plan view showing a first modified example of a first bush press-fit portion.
Figure 11:
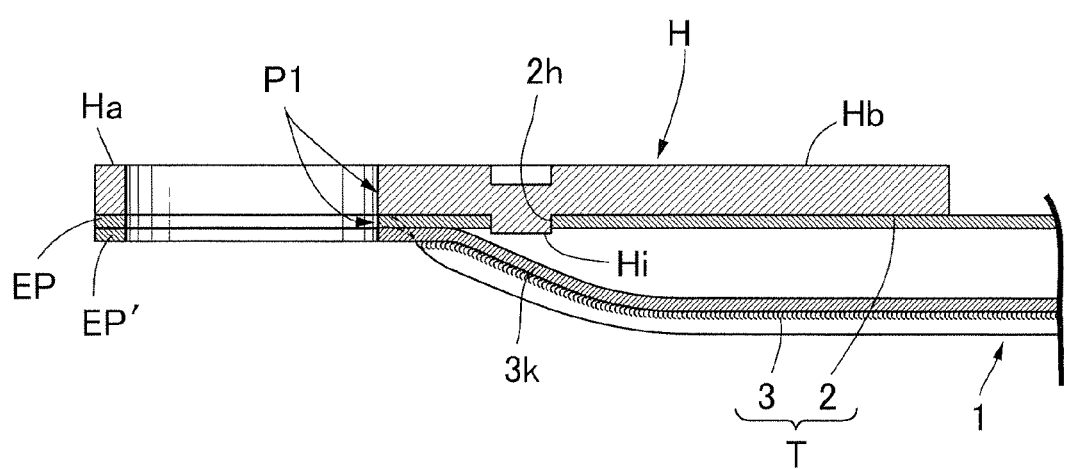
FIG. 11 is a sectional view along line 11-11 in FIG. 10.

A first modified example of the first bush press-fit portion P1 of the lower arm LA is now explained by reference to FIG. 10 and FIG. 11 in combination.

In this modified example, an arm main body 1 includes an upper plate 2 as a main plate that is press-formed, forms a main part of the arm main body 1, and has an annular eye-shaped end part EP integrally provided with one end part, and a reinforcing plate H that is superimposed on an upper face of the upper plate 2 and reinforces the upper plate 2 and, moreover, in the illustrated example a lower plate 3 has an annularly press-formed eye-shaped end part EP' integrally provided with one end via an inclined connecting part 3k and superimposed coaxially on the eye-shaped end part EP of the upper plate 2.

The reinforcing plate H has an eye-shaped head part Ha and a tail part Hb, the eye-shaped head part Ha being formed in an annular shape and arranged coaxially with the short cylindrical part in the same manner as in the preceding embodiment and the tail part Hb extending integrally from the eye-shaped head part Ha along the longitudinal direction of the upper plate 2, and the reinforcing plate H is formed by punching out a steel plate that is thicker than the upper and lower plates 2 and 3 using a press. Of the reinforcing plate H, at least the tail part Hb is welded to the upper plate 2 along substantially the whole length. The eye-shaped head part Ha of the reinforcing plate H and the short cylindrical parts EP and EP' of the upper and lower plates 2 and 3 are not welded together in the illustrated example, but may be welded together as necessary.

A first bush press-fit portion P1 is formed from an inner peripheral face of the press-formed eye-shaped head part Ha and inner peripheral faces of the eye-shaped end parts EP and EP', which are press-formed in the same manner as for the inner peripheral face of the eye-shaped head part Ha. Therefore, an outer peripheral collar B1c of a first rubber bush B1 is fitted into and retained by these inner peripheral faces by sequentially press-fitting from one side in the axial direction (the upper side in the illustrated example).

Furthermore, a positioning projection Hi for carrying out positioning of the reinforcing plate H relative to the upper plate 2 in cooperation with a positioning hole 2h provided in the upper plate 2, or a positioning hole similar to one in FIG. 9, is formed in a part, close to the eye-shaped head part Ha, of the tail part Hb of the reinforcing plate H.

In this first modified example also, basically the same operational effects as those of the preceding embodiment are thereby obtained, and flanging of the arm main body 1 for forming the bush press-fit portion P1 can be omitted while maintaining an integrated structural portion for the arm main body 1 and the bush press-fit portion P1, thus improving the productivity and reducing the machining cost.

A second modified example of the first bush press-fit portion P1 of the lower arm LA is now explained by reference to FIG. 12 to FIG. 14.

In this modified example, an arm main body 1 includes a hollow frame T and a reinforcing plate H, the hollow frame T being a body formed by joining upper and lower plates 2 and 3 forming a main part of the arm main body 1, and the reinforcing plate H having an annular eye-shaped head part Ha and a tail part Hb extending integrally from the eye-shaped head part Ha and having the tail part Hb inserted into and welded to a hollow part at one end of the hollow frame T. In the illustrated example, the tail part Hb of the reinforcing plate H is fixed to an inner face of the upper plate 2 (that is, engaged with an inwardly curved part of an upper wall part of the upper plate 2 and welded to inner faces of left and right side wall parts), and after this fixing the upper plate 2 and the lower plate 3 are joined. An inner peripheral face of the eye-shaped head part Ha forms the first bush press-fit portion P1, and an outer peripheral collar B1c of the first rubber bush B1 is fitted into and retained by the inner peripheral face by press-fitting from one side in the axial direction (the upper side in the illustrated example).

Figure 12:
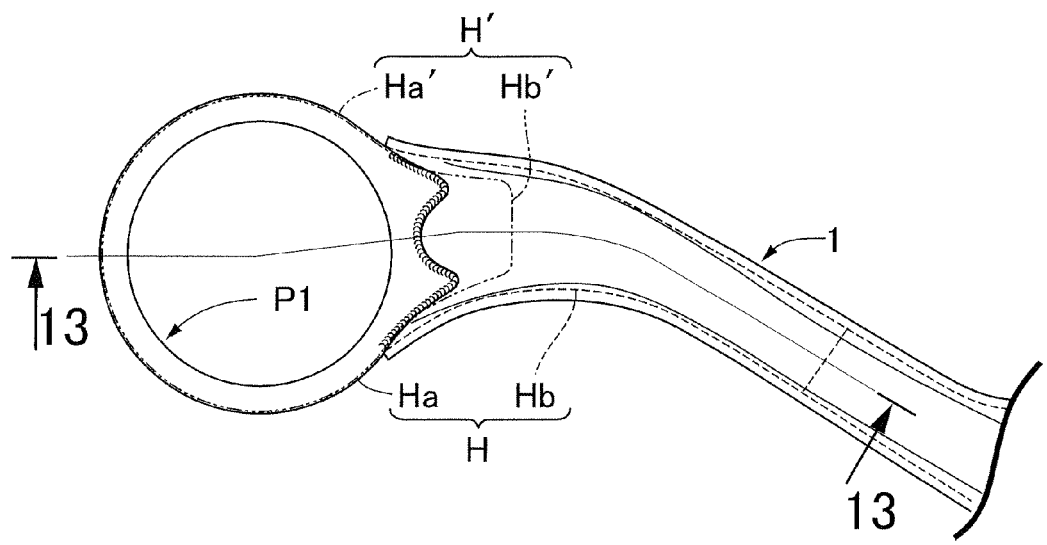
FIG. 12 is a plan view showing a second modified example of the first bush press-fit portion.
Figure 13:
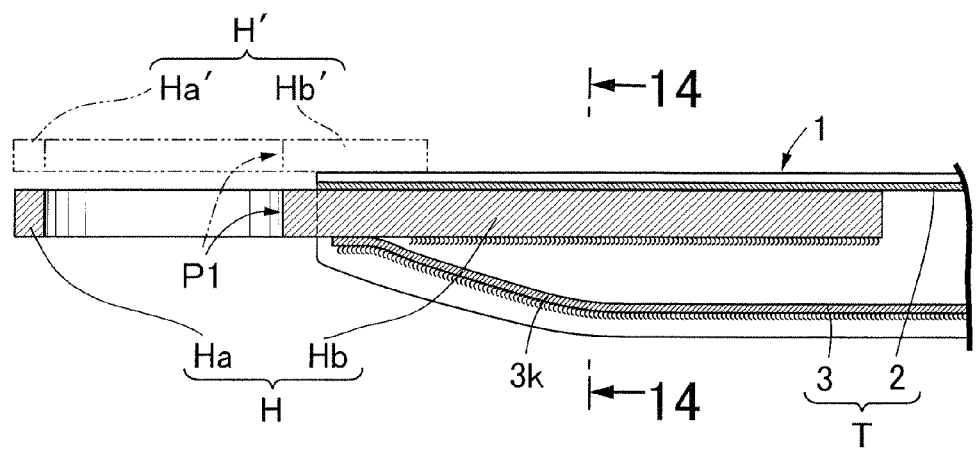
FIG. 13 is a sectional view along line 13-13 in FIG. 12.
Figure 14:
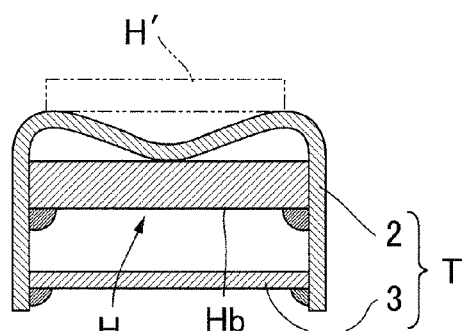
FIG. 14 is a sectional view along line 14-14 in FIG. 13.

In a vehicle such as a sports vehicle, in which a large press-fit retaining load for the first bush press-fit portion P1 is required, a second reinforcing plate H' may further be provided as shown by double-dotted dashed lines in FIG. 12 to FIG. 14, the second reinforcing plate having an annular eye-shaped head part Ha' and a tail part Hb' extending integrally from the eye-shaped head part Ha' and having the tail part Hb' welded to an upper face of one end of the hollow frame T. In this case, the first bush press-fit portion P1 is formed from inner peripheral faces of the eye-shaped head parts Ha and Hb; Ha' and Hb' of the two reinforcing plates H and H'. The outer peripheral collar B1c of the first rubber bush B1 is therefore fitted into and retained by these inner peripheral faces by sequentially press-fitting from one side in the axial direction (the upper side in the illustrated example).

Figure 15:
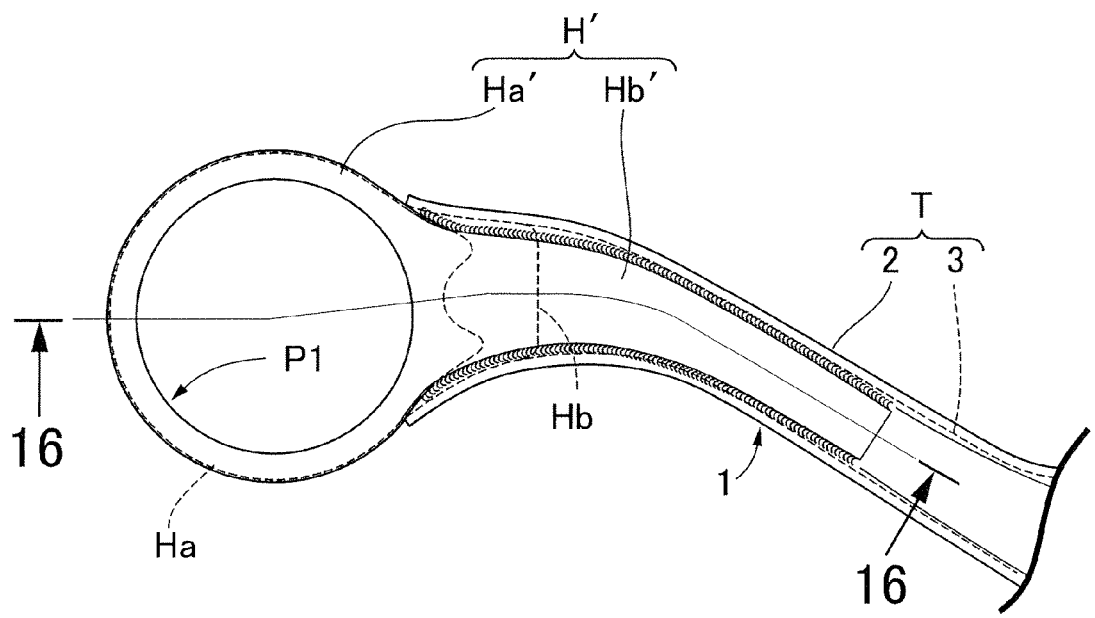
FIG. 15 is a plan view showing a third modified example of the first bush press-fit portion.
Figure 16:
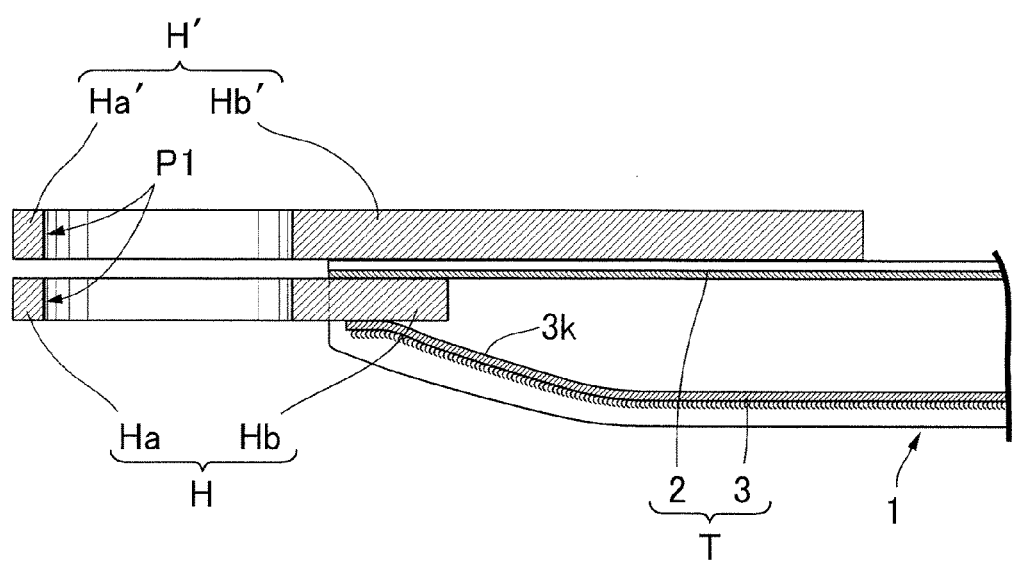
FIG. 16 is a sectional view along line 16-16 in FIG. 15.

In this second modified example, the tail part Hb of the reinforcing plate H inserted into and welded to the interior of the hollow frame T is formed so as to be longer than the tail part Hb' of the reinforcing plate H' outside the hollow frame T, and extends along the longitudinal direction of the hollow frame T, but an arrangement in which, in contrast to this second modified example, the tail part Hb' of the reinforcing plate H' outside the hollow frame T is formed so as to be longer than the tail part Hb of the reinforcing plate H inserted into and welded to the interior of the hollow frame T and extends in the longitudinal direction of the hollow frame T is a third modified example shown in FIG. 15 and FIG. 16.

In the second and third modified examples also, basically the same operational effects as those of the preceding embodiment are thereby obtained and, moreover, flanging of the arm main body 1 for forming the bush press-fit portion P1 can be omitted, thus improving the productivity and reducing the machining cost.

In the second and third modified examples, although not illustrated, as in the above-mentioned embodiment, a positioning projection or hole for carrying out positioning of the reinforcing plate H or H' relative to the hollow frame T in cooperation with a positioning hole provided in the upper or lower plate 2 or 3 may be formed in a part, close to the eye-shaped head part Ha or Ha', of the tail part Hb or Hb' of at least one of the reinforcing plates H and H'.

Figure 18:
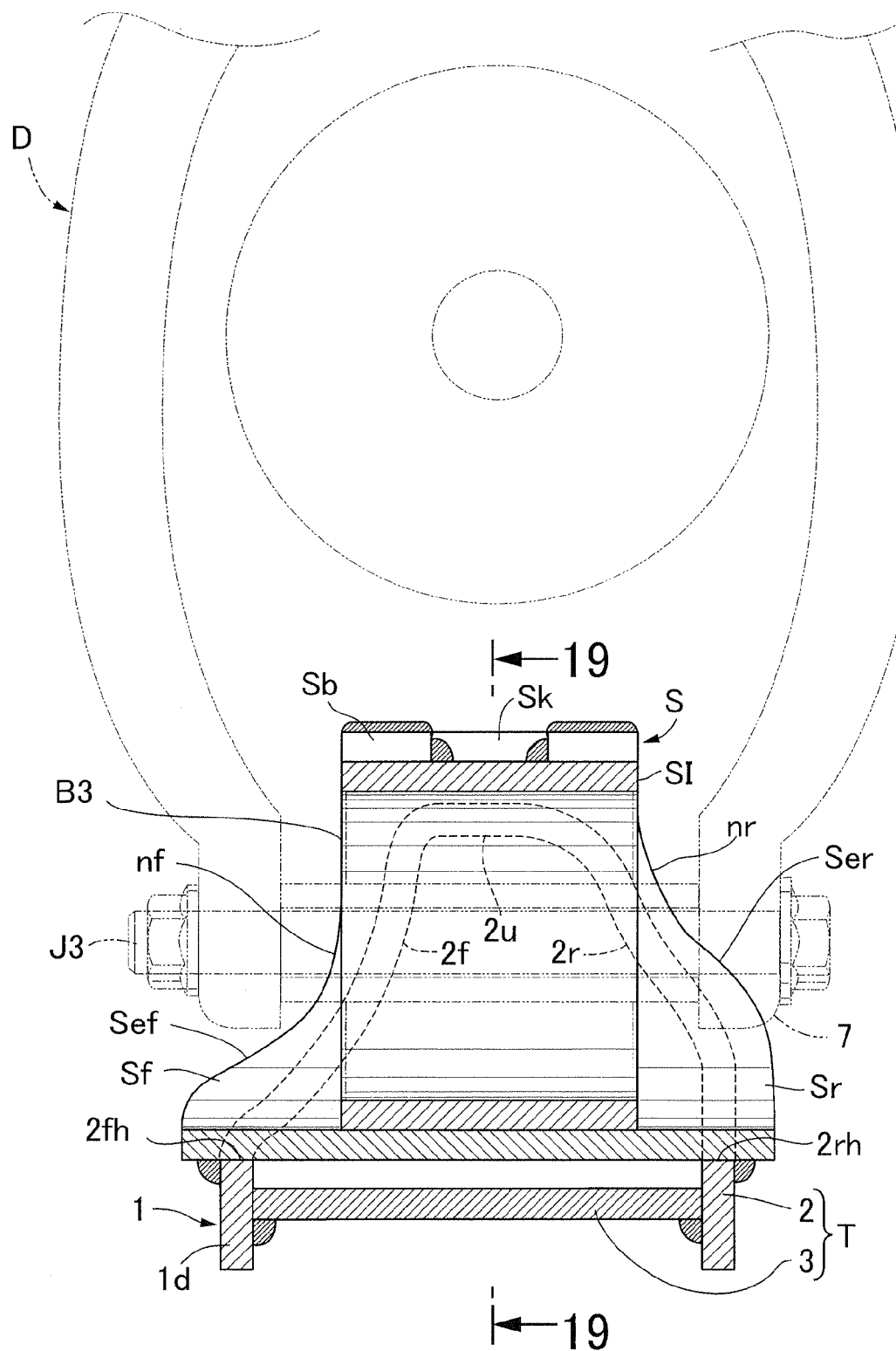
FIG. 18 is an enlarged sectional view along line 18-18 in FIG. 17.
Figure 19:
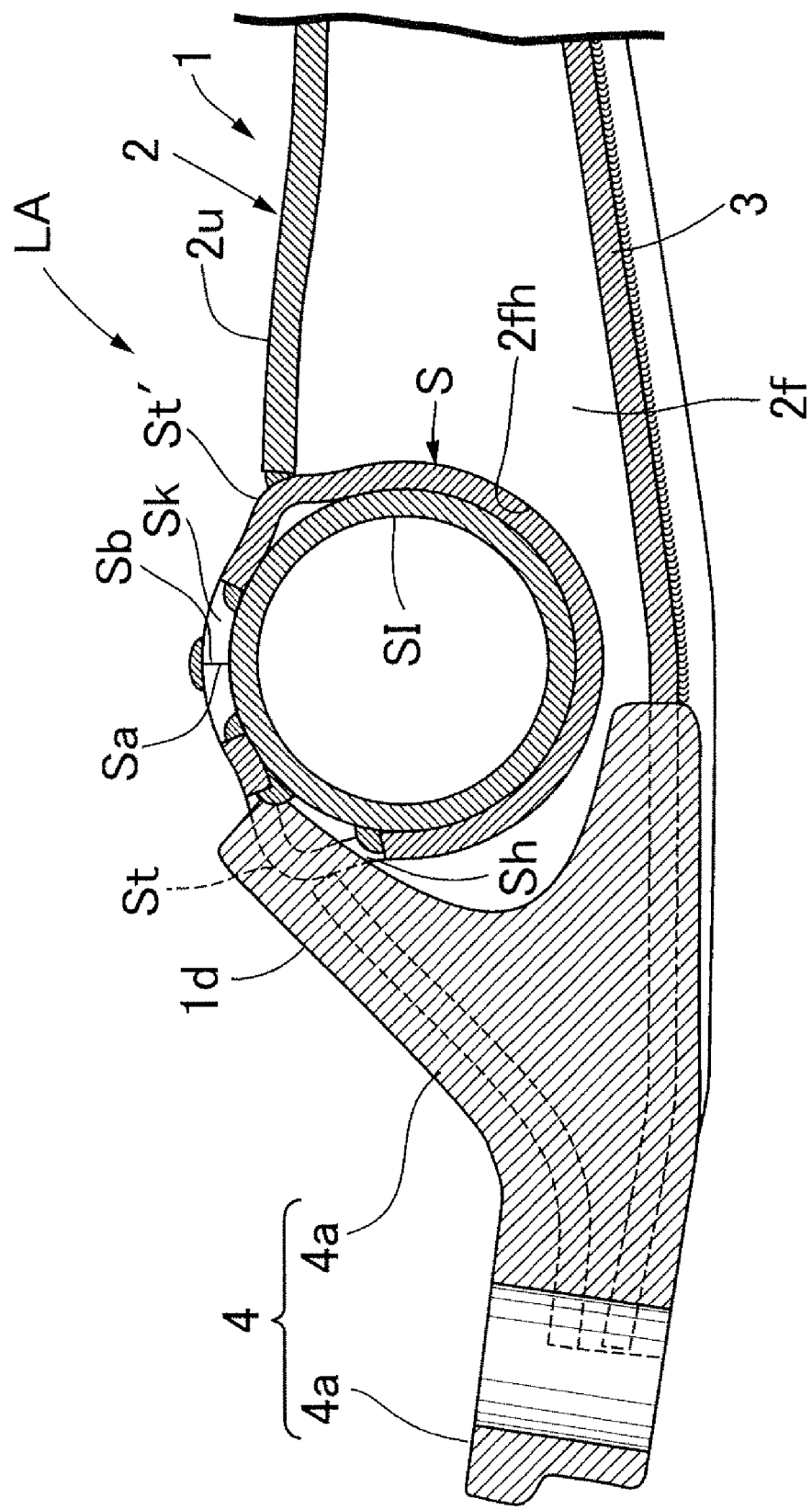
FIG. 19 is a sectional view along line 19-19 in FIG. 18.

A structure connecting the lower arm LA and the damper D is now explained by reference in addition to FIG. 17 to FIG. 19.

A middle part 1d close to the outer end, which becomes a damper support part, of the arm main body 1 (the outer arm portion 1A in the illustrated example) is joined to a fork-shaped lower end part 7 of a damper D, which straddles the middle part 1d with a gap $S_D$, via a connecting pin J3 laterally bridging the lower end part 7 and extending in a substantially longitudinal direction of the vehicle body and a third rubber bush B3 surrounding the pin J3. A substantially cylindrical bush support sleeve S is mounted on the middle part 1d of the arm main body 1, the bush support sleeve S having the third rubber bush B3 press-fitted thereinto so that it is supported on the middle part 1d. A drive shaft 10 for driving a wheel or a protective boot PB covering a joint of the shaft 10 is disposed in the gap $S_D$ so as to run through it, and the outer end of the shaft 10 is coupled to the wheel W so as to rotate as a unit.

The middle part 1d, which extends in the vehicle width direction of the arm main body 1 (the outer arm portion 1A), is formed so as to have a substantially trapezoidal cross-section in which, in the same way as the other parts of the arm main body 1, the lower wall (lower plate 3) is longer than the upper wall (upper wall part 2u of the upper plate 2) and the front side wall (front side wall part 2f of the upper plate 2) and the rear side wall (rear side wall part 2r of the upper plate 2) widen in going downward. The front side wall part 2f and the rear side wall part 2r have a pair of front and rear sleeve holes 2fh and 2rh having front and rear end parts respectively of the bush support sleeve S fitted thereinto, and the front and rear end parts of the bush support sleeve S further have welding margin parts Sf and Sr, provided so as to protrude outward slightly from the arm main body 1, for welding the sleeve S to the arm main body 1. The bush support sleeve S is therefore formed in a substantially trapezoidal shape when viewed from the side so as to ensure that there are the necessary welding margin parts Sf and Sr corresponding to the cross-sectional shape of the arm main body 1.

Since, in this way, the cross-sectional shape of the middle part 1d of the arm main body (outer arm portion 1A) is a substantially trapezoidal shape in which the lower wall is longer than the upper wall and the front side wall and the rear side wall widen in going downward, and the bush support sleeve S is formed in a substantially trapezoidal shape, corresponding to the cross-sectional shape of the arm main body middle part 1d, when viewed from the side so that the welding margin parts Sf and Sr for the sleeve S and the arm main body 1 can be guaranteed, a design is possible in which a sufficient cross-sectional width with respect to a large vertical input load acting on the arm main body 1 from the fork-shaped lower end part 7 of the damper D via the sleeve S and the bush B3 and a large fore-and-aft input load (brake reaction) from the wheel W can be efficiently imparted to the arm middle part 1d itself in a confined space, and it is possible to ensure that there is sufficient strength even for an arm main body 1 having a plate structure.

Furthermore, concavely shaped clearances nf and nr are formed on front and rear end faces Sef and Ser of the bush support sleeve S in order to guarantee a minimum necessary clearance between the fork-shaped lower end part 7 of the damper D and the sleeve S when there is relative displacement between the fork-shaped lower end part 7 and the arm main body 1 as shown by double-dotted dashed lines in FIG. 1. This eliminates the possibility of interference between the downwardly widening sleeve front and rear end faces Sef and Ser and the fork-shaped lower end part 7 of the damper D even when the side face of the sleeve has a trapezoidal shape corresponding to the cross-section of the arm main body 1 as described above.

In the illustrated example, the bush support sleeve S is formed in a tubular shape by wrap-forming a press-formed plate type sleeve material so as to connect together one edge part Sa and the other edge part Sb, and butt-welding said one edge part Sa and said other edge part Sb together. Therefore, even when the front and rear end faces Sef and Ser of the bush support sleeve S widen in going downward when viewed from the side as described above and have a complicated line shape due to the presence of the clearances nf and nr, the complicated line shape can be formed with good precision by simple press-forming of the plate type sleeve material, thus improving the precision of the machining step and increasing the efficiency.

Furthermore, in the illustrated example, a cutout hole-shaped depression is formed in each of opposing faces of said one edge part Sa and said other edge part Sb of the bush support sleeve S, which abut against each other, the two depressions forming a through hole Sk straddling the opposing faces. An inner face of the through hole Sk and an outer peripheral face of an inner sleeve SI exposed through the through hole Sk are welded together, thus enhancing the bond strength between the sleeves S and SI as well as the bond strength between said one edge part Sa and said other edge part Sb.

Figure 20:
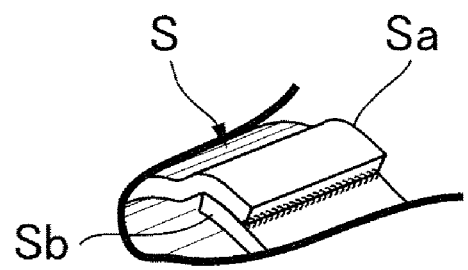
FIG. 20 are partial perspective views of a modified example of a wrap-formed structure of a bush support sleeve.
Figure 20:
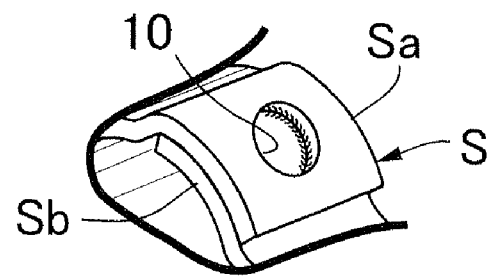

The technique for bonding the edges Sa and Sb by wrap-forming the bush support sleeve S is not limited to that of the illustrated example, and may involve, for example, butt-welding along the whole area between opposing faces of the two edge parts Sa and Sb while omitting the through hole Sk. Instead of the above-mentioned butt-welding, as shown in FIG. 20 the two edge parts Sa and Sb of the plate type sleeve material may partially overlap each other in the radial direction of the sleeve, and the overlapped sections may be welded. In this case, as shown in FIG. 20(a) just the edge parts of the overlapped section may simply be welded, or alternatively as shown in FIG. 2(b) a hole 10 may be formed in advance in one edge part Sa, which is on the outer side of the overlapped section, and an inner peripheral face of this hole 10 and the other edge part Sb may be welded.

Moreover, in the illustrated example, the simple cylindrical inner sleeve SI, which is shorter than the bush support sleeve S, is fitted into and welded to the inner peripheral face of the sleeve S, and the third bush B3 is press-fitted into the bush support sleeve S via the inner sleeve SI. In accordance with such a double layer structure for the sleeves S and SI, even when the side face configuration of the bush support sleeve S is a trapezoidal shape as described above, since a double layer sleeve structure in which the inner sleeve SI is provided only for a section necessary for retaining the bush (that is, omitting as much surplus material as possible) is obtained, it becomes possible to increase the rigidity and strength of the sleeves S and SI sufficiently while reducing the overall weight thereof. Furthermore, since the machining precision for the outer sleeve S can be relatively low compared with that for the inner sleeve SI, which directly retains the bush B3, the corresponding machining cost can be saved.

The pair of sleeve holes 2fh and 2rh are each formed as a cutout opening upward in the illustrated example, and communicate with each other via an opening provided in the arm main body 1 (upper plate 2) so as to transect its upper wall. This enables the use of a bush support sleeve S having a relatively large diameter such that part thereof juts out from the sleeve holes 2fh and 2rh and, moreover, the sleeve holes 2fh and 2rh and the opening O are formed by press-forming or by a combination of press-forming and plasma-cutting, etc., thus making the machining operation relatively easy and reducing the cost.

Figure 17:
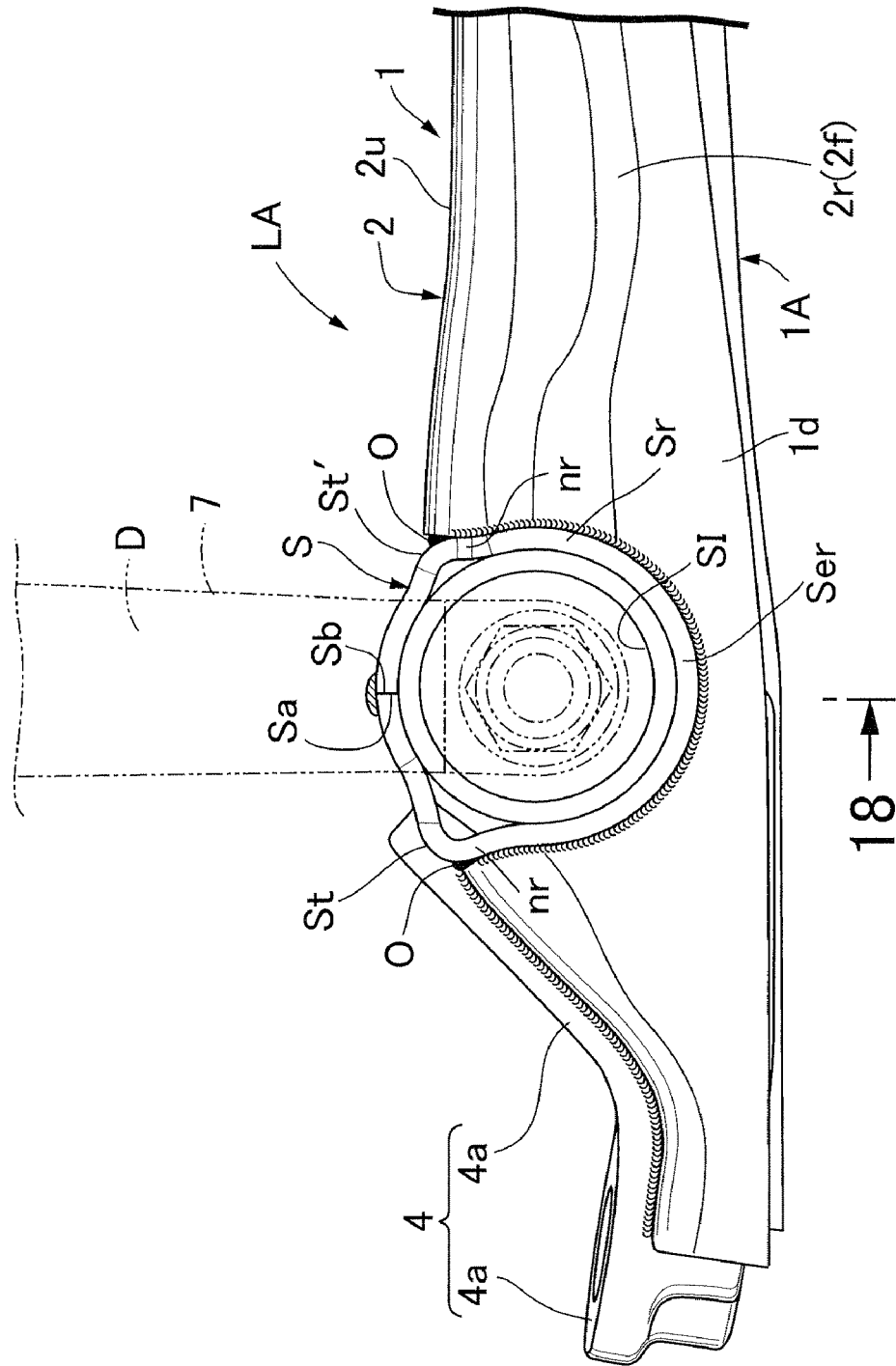
FIG. 17 is an enlarged view from arrow 17 in FIG. 3.

As shown in FIG. 17, in relation to the opening O in the upper wall of the arm main body 1 (upper plate 2) being formed by press-forming or plasma-cutting, etc., an inside face of the opening O is substantially perpendicular to the outer face of the arm main body 1. Therefore, when the outer peripheral face of the bush support sleeve S is a simple cylindrical face, a V-shaped gap that opens out relatively widely is formed between the inside face of the opening O and the outer peripheral face of the bush support sleeve S, and this is disadvantageous in terms of increasing the welding strength of a welded part in the gap. In this embodiment, the pair of rib parts St and St' protruding radially outward of the bush support sleeve S are formed on a peripheral wall of the sleeve S so as to correspond to two opposing inside faces of the opening O, the rib parts St and St' extending along generatrixes of the sleeve S and being spaced from each other in the peripheral direction, and this enables the V-shaped gap between the inside face of the opening O and the bush support sleeve S (the rib parts St and St') to be as small as possible, thereby enhancing effectively the welding strength of the welded part in the gap.

As described above, the support bracket 4, which can retain the wheel-supporting ball joint BJ, is joined to said outer end part of the arm main body 1 (the outer arm portion 1A) along the longitudinal direction of said other end part, and in the illustrated example this support bracket 4 is formed integrally from an eye-shaped head part 4a at the outer end and a tail part 4b at the inner end, the eye-shaped head part 4a being capable of retaining the ball joint BJ, and the tail part 4b extending from the eye-shaped head part 4a along the longitudinal direction of the arm main body 1. An upper edge part of the tail part 4b is fitted into and welded to a slit 2us provided in the upper wall part 2u of the upper plate 2 and having one end communicating with the opening, whereas a lower edge part of the tail part 4b is fitted into and welded to a slit 3s provided in the lower plate 3.

The inner end side of the tail part 4b is formed in a vertically bifurcated fork shape, and the upper part of the inner end is inserted into and welded to an engagement hole Sh as an engagement recess formed in the rib part St provided on the outer periphery of the bush support sleeve S. In this way, utilizing the rib part St of the bush support sleeve S enables the region of the support bracket 4 welded to the arm main body 1 side to be extended, thus enhancing the bond strength of the support bracket 4 to the arm main body 1 as well as enhancing the bond strength of the bush support sleeve S.

Figure 21:
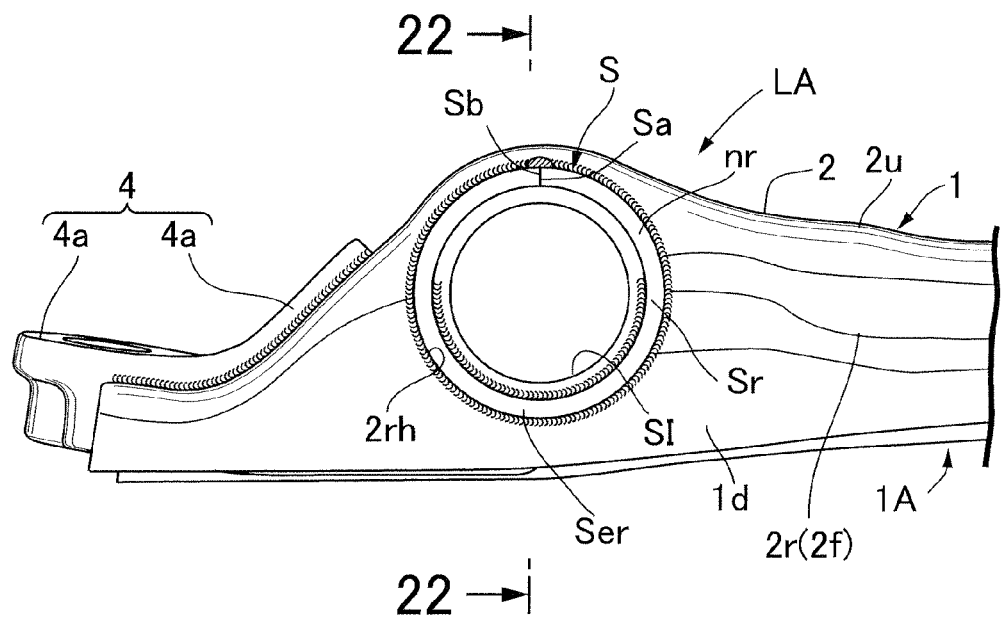
FIG. 21 is a view, corresponding to FIG. 17, of a first modified example of a structure in which the bush support sleeve and an arm main body are joined.
Figure 22:
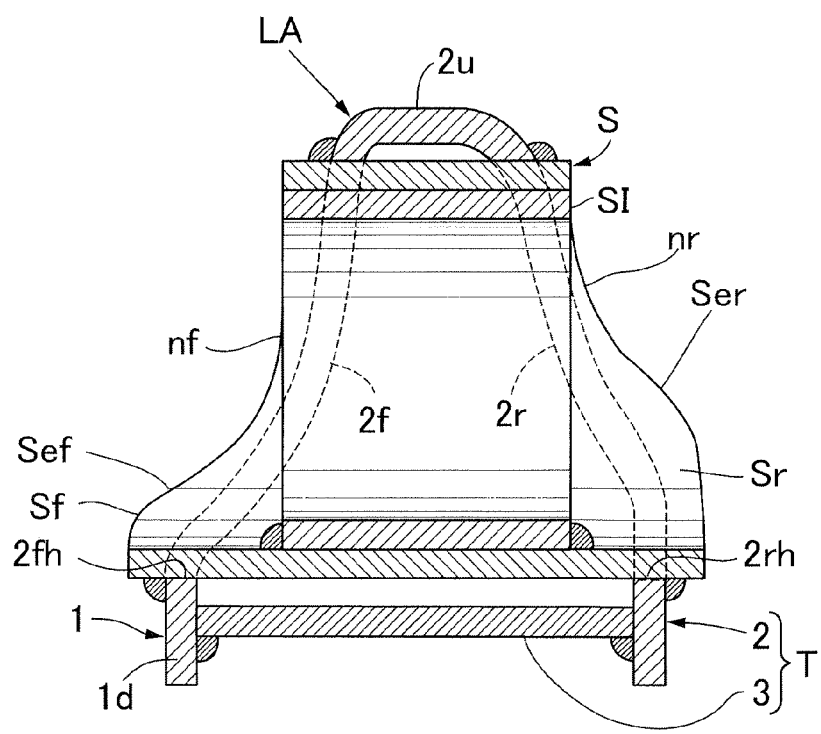
FIG. 22 is a sectional view along line 22-22 in FIG. 21.

A first modified example of the bonding structure of the bush support sleeve S and the arm main body 1 is now explained by reference to FIG. 21 and FIG. 22. In this modified example, the pair of front and rear sleeve holes 2fh and 2rh provided in the front and rear side wall parts respectively of the middle part 1d of the arm main body 1 are formed as circular holes instead of as cutout holes, the bush support sleeve S, which has a circular cross-section (that is, the pair of rib parts St and St' of the sleeve outer peripheral part are omitted) is fitted into and welded to the sleeve holes 2fh and 2rh formed as circular holes, and the same inner sleeve SI as in the preceding embodiment is further fitted into and welded to the inner peripheral face of the sleeve S. In this embodiment also, the shapes of the front and rear end faces Sef and Ser of the bush support sleeve S are formed in the same manner as for the preceding embodiment.

Figure 23:
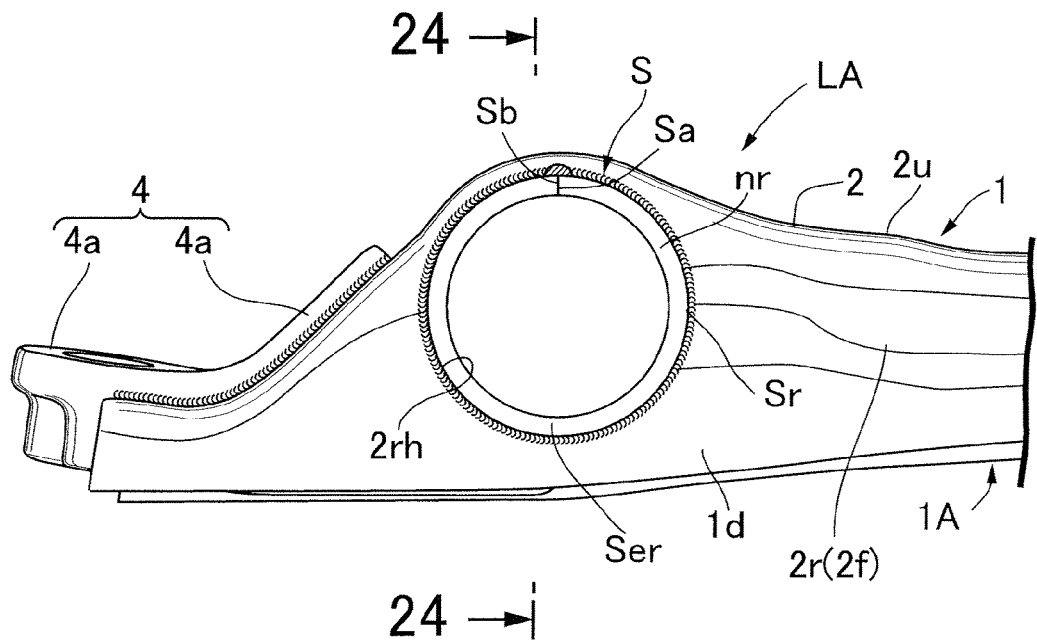
FIG. 23 is a view, corresponding to FIG. 17, showing a second modified example of the structure in which the bush support sleeve and the arm main body are joined.
Figure 24:
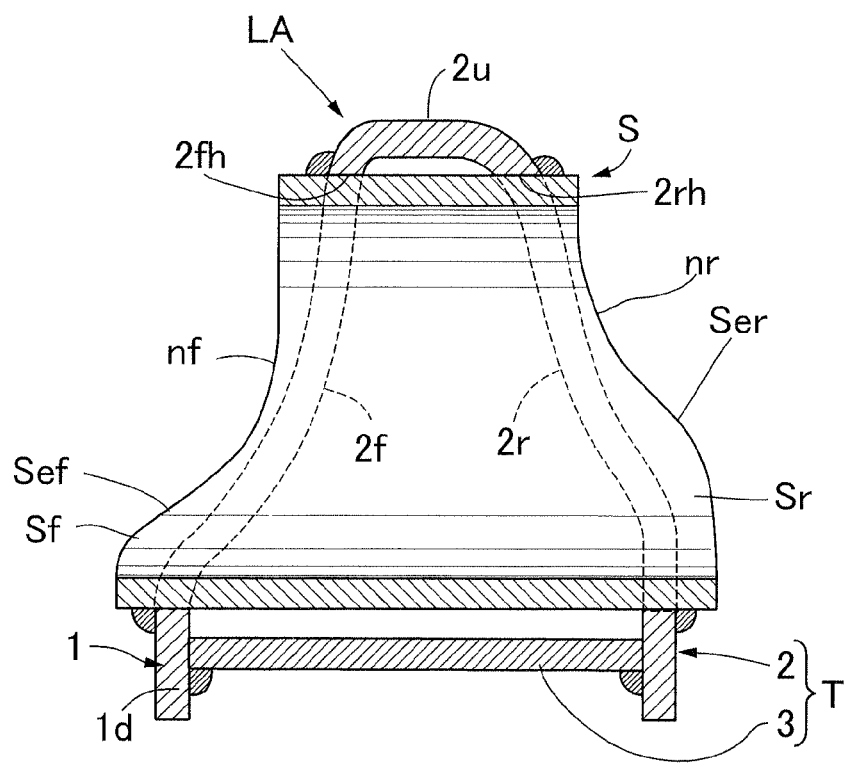
FIG. 24 is a sectional view along line 24-24 in FIG. 23.

A second modified example of the bonding structure of the bush support sleeve S and the arm main body 1 is now explained by reference to FIG. 23 and FIG. 24. This modified example is an arrangement in which the inner sleeve SI of the structure of the preceding first modified example is omitted and the third rubber bush B3 is directly press-fitted into and retained by the inner peripheral face of the bush support sleeve S, thus simplifying the structure.

An embodiment of the present invention is explained in detail above, but the present invention is not limited to the embodiment and variety of small design changes may be carried out.

For example, in the above-mentioned embodiment, the A type lower arm LA was illustrated as the suspension arm, but the present invention may be carried out with an arm other than an A type, such as an I type arm, or the upper arm.

Furthermore, in the above-mentioned embodiment, the upper plate 2 and the lower plate 3 forming the arm main body 1 are joined by welding, but in the present invention the upper plate 2 and the lower plate 3 may be joined by fixing means other than welding.

Moreover, in the above-mentioned embodiment, the bush support sleeve S is formed by wrap-forming a plate material in a tubular shape, but the bush support sleeve S may be formed by machining opposite end faces of a continuous cylindrical material so as to have a predetermined shape.

Figure 25:
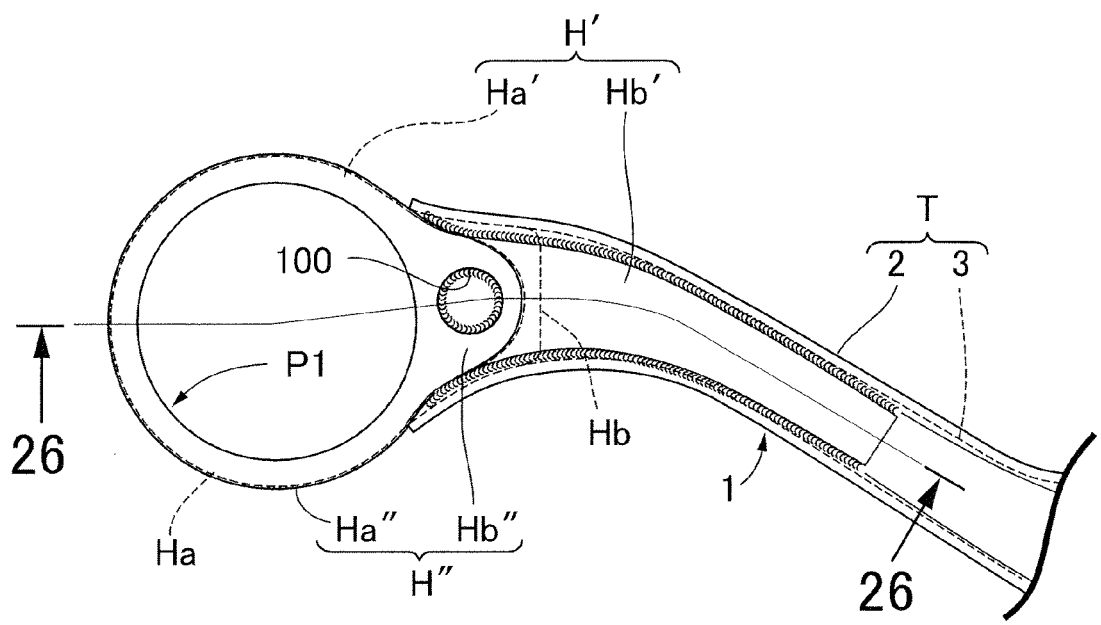
FIG. 25 is a view, corresponding to FIG. 15, showing another embodiment in which a structure for locally reinforcing a reinforcing plate by means of the addition of a local strengthening plate is applied to the third modified example of the first bush press-fit portion.
Figure 26:
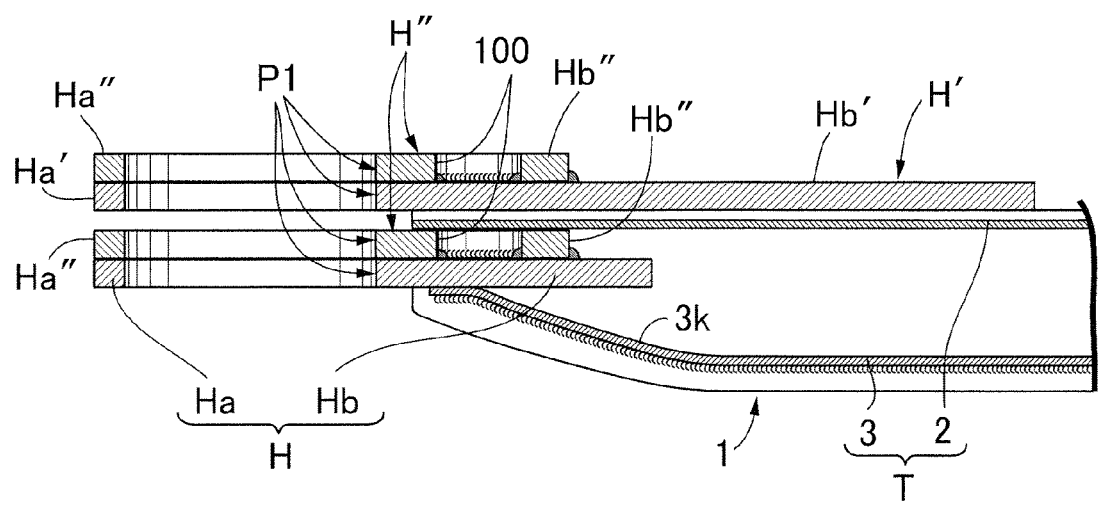
FIG. 26 is a sectional view along line 26-26 in FIG. 25.
Figure 27:
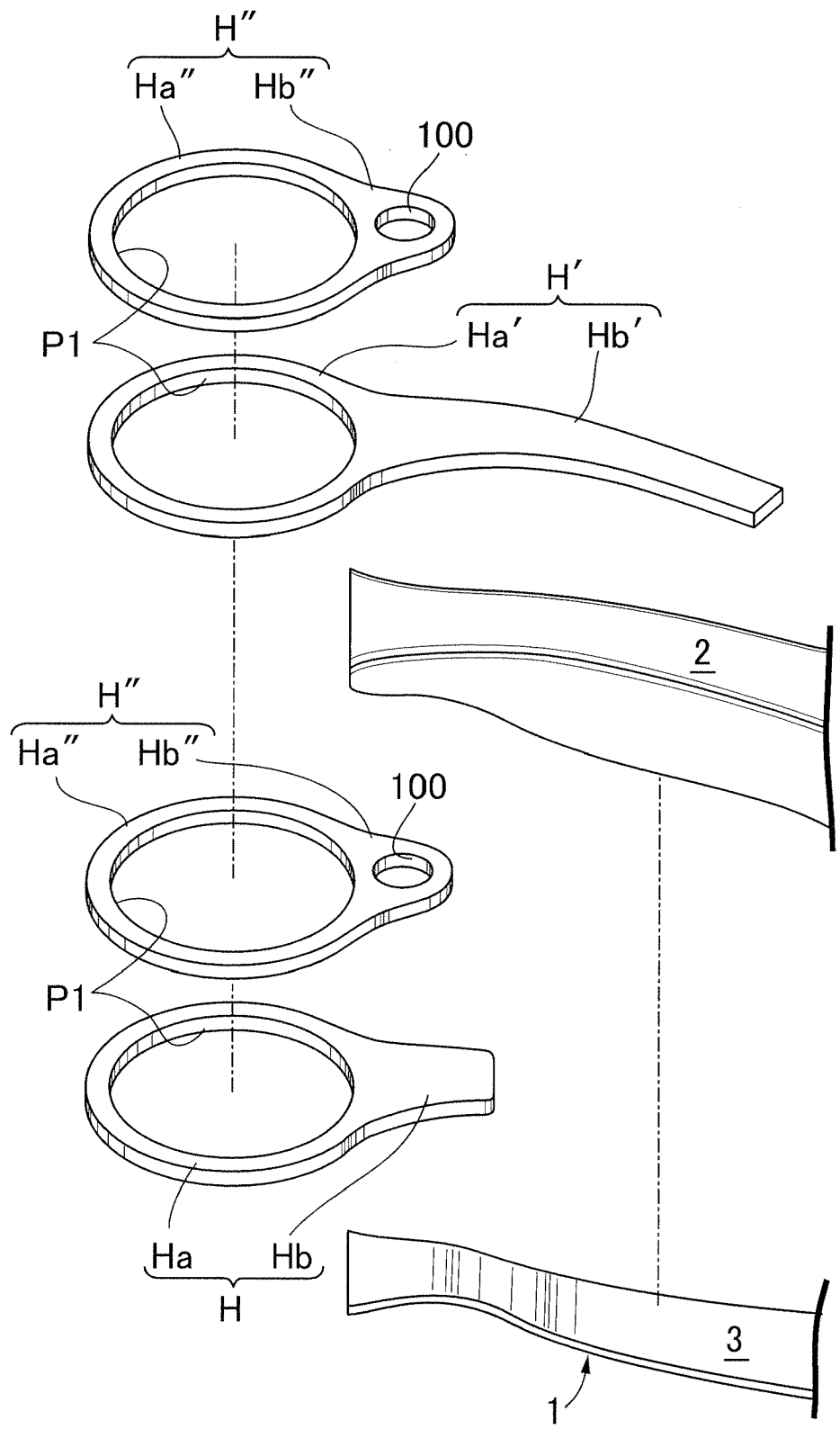
FIG. 27 is an exploded perspective view of the other embodiment.

Furthermore, in the above-mentioned embodiment, in order to form the first bush press-fit portion P1, the arm main body 1 is joined only to the reinforcing plate H or only to the reinforcing plate H and the second reinforcing plate H', but in the ninth to eleventh aspects of the present invention, a local strengthening plate H" mainly for reinforcing the area around the first bush press-fit portion P1 may be joined in a layered state to one or both of the reinforcing plate H and the second reinforcing plate H', and one example in which a local structure for reinforcing the reinforcing plates H and H' by means of the local strengthening plate H" is applied to the third modified example shown in FIG. 15 and FIG. 16 is shown in FIG. 25 to FIG. 27. That is, the local strengthening plate H" is formed from a press-formed steel plate integrally having an annular ring part Ha" and a tongue piece Hb", the ring part Ha" being superimposed on the eye-shaped head parts Ha and Ha' of the reinforcing plate H and H', and the tongue piece Hb" being superimposed only partially on the base side of the tail parts Hb and Hb' of the reinforcing plates H and H'. The local strengthening plate H" is integrally joined in a layered state to the reinforcing plates H and H', and an inner peripheral face of the ring part Ha" of the local strengthening plate H" also forms the first bush press-fit portion P1. The tongue piece Hb" has a through hole 100 running vertically therethrough, an inner face of this hole 100 and the tail parts Hb and Hb', on which the tongue piece Hb" is superimposed, are welded, and this weld allows the local reinforcing plate H" and the reinforcing plates H and H' to be joined.

In this embodiment, due to the layering effect of the local strengthening plate H", the bush retaining strength can be enhanced by increasing effectively the axial width of the bush press-fit portion P1 while minimizing the increase in thickness of the tail parts Hb and Hb' of the reinforcing plates H and H' (that is, while reducing the weight of the reinforcing plates H and H') and, moreover, the overall cross-section of the reinforcing plates H and H' and the local strengthening plate H" thins in sequence from the bush press-fit portion P1 to the arm main body 1 side so as to make a smooth transition to the cross-section of the arm main body. A local reinforcing structure for the reinforcing plate H employing the local strengthening plate H" may be applied in the embodiment shown in FIG. 6 to FIG. 9 or the modified examples shown in FIG. 11 to FIG. 14.

The invention claimed is:

1. A vehicular suspension arm comprising:
   an arm main body; and
   a bush press-fit portion that is provided at one end of the arm main body and into which a bush is press-fitted,
   wherein the arm main body comprises:
   at least a main plate press-formed as a main part of the arm main body and having a substantially U-shaped cross-section with a substantially flat upper wall part, front and rear side walls extending downward toward a lower end opening from respective front and rear ends of the upper wall part, and a short cylindrical part provided integrally with one end by flanging,
   a lower plate welded between inner faces of respective lower end parts of the front and rear side walls to substantially close the lower end opening of the main plate; and
   a reinforcing plate superimposed on the main plate and reinforcing the main plate;
   wherein the reinforcing plate has an eye-shaped head part formed in an annular shape and arranged coaxially with the short cylindrical part, and a tail part extending integrally from the eye-shaped head part along the longitudinal direction of the main plate, is formed from a plate material that is thicker than the main plate, and has at least the tail part welded to an upper surface of the upper wall part of the main plate; and
   wherein the bush press-fit portion is formed from an inner peripheral face of the eye-shaped head part and an inner peripheral face of the short cylindrical part.

2. A vehicular suspension arm comprising:
   an arm main body; and
   a bush press-fit portion that is provided at one end of the arm main body and into which a bush is press-fitted,
   wherein the arm main body comprises:
   at least a main plate press-formed as a main part of the arm main body and having a substantially U-shaped cross-section with a substantially flat upper wall part, front and rear side walls extending downward toward a lower end opening from respective front and rear ends of the upper wall part, and a short cylindrical part provided integrally with one end by flanging,
   a lower plate welded between inner faces of respective lower end parts of the front and rear side walls to substantially close the lower end opening of the main plate; and
   a reinforcing plate superimposed on the main plate and reinforcing the main plate:
   wherein the reinforcing plate has an eye-shaped head part formed in an annular shape and arranged coaxially with the eye-shaped end part, and a tail part extending integrally from the eye-shaped head part along the longitudinal direction of the main plate, is formed from a plate material that is thicker than the main plate, and has at least the tail part welded to an upper surface of the upper wall part of the main plate; and
   wherein the bush press-fit portion is formed from an inner peripheral face of the eye-shaped head part or an inner peripheral face of the eye-shaped head part and an inner peripheral face of the eye-shaped end part.

3. The vehicular suspension arm according to any one of claims 1 or 2, wherein the reinforcing plate is formed by punching out a single plate material using a press.

4. The vehicular suspension arm according to either claim 1 or 2, wherein the reinforcing plate has formed thereon a positioning projection or hole, the positioning projection or hole carrying out positioning of the reinforcing plate relative to the main plate in cooperation with a positioning hole provided in the main plate.

5. A vehicular suspension arm comprising:
   an arm main body formed as a hollow body from a press-formed metal plate and having one end connected to a vehicle body side and the other end connected to a wheel side; and
   a bush support sleeve for fitting and supporting a connecting bush for a fork-shaped lower end part of a damper, the fork-shaped lower end part having a gap and straddling a middle part of the arm main body in substantially the width direction of the arm main body,
   wherein a drive shaft runs through the gap,
   wherein the arm main body comprises a pair of front and rear sleeve holes formed in a front side wall and a rear side wall respectively of the middle part, the bush support sleeve having opposite ends fitted into the front and rear sleeve holes, and the bush support sleeve having welding margin parts for welding the sleeve and the arm main body provided on the opposite end parts so as to protrude outward from the arm main body;

wherein the middle part of the arm main body is formed to have a substantially trapezoidal cross-section in which a lower wall is longer than an upper wall and a distance between a front side wall and a rear side wall grows wider in going downward from the upper wall to the lower wall; and wherein the bush support sleeve is formed in a substantially trapezoidal shape, corresponding to the cross-sectional shape of the arm main body, when viewed from the side, so that the welding margin parts are exposed, and the bush support sleeve further has a concave clearance formed on each of front and rear end faces to ensure a clearance between the fork-shaped lower end part of the damper and the sleeve when there is relative displacement between the fork-shaped lower end part and the arm main body.

6. The vehicular suspension arm according to claim 5, wherein the bush support sleeve is formed in a tubular shape by wrap-forming a press-formed plate type sleeve material so that one edge part and the other edge thereof are connected to each other, and said one edge part and said other edge part are welded to each other.

7. The vehicular suspension arm according to either claim 5 or 6, wherein the bush support sleeve has a simple cylindrical inner sleeve fitted into and fixed to an inner peripheral face, the inner sleeve being shorter than the sleeve, and the bush is fitted into and supported by the bush support sleeve via the inner sleeve.

8. The vehicular suspension arm according to any one of claim 5 or 6, wherein the pair of sleeve holes are formed as a cutout opening upward, and communicate with each other via an opening provided in the arm main body (1) to transect the upper wall (2*u*).

9. The vehicular suspension arm according to claim 8, wherein the opening has opposing inside faces substantially perpendicular to an outer face of the arm main body, the bush support sleeve has a pair of rib parts on a peripheral wall to correspond to each of the two inside faces of the opening, the rib parts protruding outward in the radial direction of the sleeve and being formed along generatrixes of the sleeve and spaced from each other in the peripheral direction, and each of the rib parts and the inside face of the opening are welded.

10. The vehicular suspension arm according to claim 9, wherein the arm main body has a support bracket joined to said other end part along the longitudinal direction of said other end part, the support bracket being capable of retaining a wheel-supporting ball joint on an outer end part, and the support bracket has an inner end part thereof engaged with and welded to an engagement depression formed in one of the rib parts.

11. The vehicular suspension arm according to claim 7, wherein the pair of sleeve holes are formed as a cutout opening upward, and communicate with each other via an opening provided in the arm main body to transect the upper wall.

12. The vehicular suspension arm according to claim 11, wherein the opening has opposing inside faces substantially perpendicular to an outer face of the arm main body, the bush support sleeve has a pair of rib parts on a peripheral wall to correspond to each of the two inside faces of the opening, the rib parts protruding outward in the radial direction of the sleeve and being formed along generatrixes of the sleeve and spaced from each other in the peripheral direction, and each of the rib parts and the inside face of the opening are welded.

13. The vehicular suspension arm according to claim 12, wherein the arm main body has a support bracket joined to said other end part along the longitudinal direction of said other end part, the support bracket being capable of retaining a wheel-supporting ball joint on an outer end part, and the support bracket has an inner end part thereof engaged with and welded to an engagement depression formed in one of the rib parts.

\* \* \* \* \*

UNITED STATES PATENT AND TRADEMARK OFFICE
CERTIFICATE OF CORRECTION

PATENT NO. : 7,980,576 B2  Page 1 of 1
APPLICATION NO. : 12/063601
DATED : July 19, 2011
INVENTOR(S) : Mitsuru Inoue et al.

It is certified that error appears in the above-identified patent and that said Letters Patent is hereby corrected as shown below:

Insert On Title Page:

--(73)  F. TECH CORPORATION, Saitama (JP)
HONDA MOTOR CO., LTD., Tokyo (JP)--

Signed and Sealed this
First Day of November, 2011

David J. Kappos
*Director of the United States Patent and Trademark Office*